US012472014B2

(12) United States Patent
Tojo et al.

(10) Patent No.: US 12,472,014 B2
(45) Date of Patent: Nov. 18, 2025

(54) SURGICAL ROBOT AND OPERATION METHOD FOR ARTICULATED ROBOT

(71) Applicant: KAWASAKI JUKOGYO KABUSHIKI KAISHA, Kobe (JP)

(72) Inventors: Tsuyoshi Tojo, Ibaraki (JP); Tetsuo Ichii, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 449 days.

(21) Appl. No.: 17/750,438

(22) Filed: May 23, 2022

(65) Prior Publication Data

US 2022/0370158 A1    Nov. 24, 2022

(30) Foreign Application Priority Data

May 24, 2021  (JP) .................................. 2021-087197

(51) Int. Cl.
*A61B 34/30* (2016.01)
*A61B 1/00* (2006.01)
*A61B 34/20* (2016.01)

(52) U.S. Cl.
CPC .......... *A61B 34/30* (2016.02); *A61B 1/00117* (2013.01); *A61B 1/00147* (2013.01); *A61B 2034/2055* (2016.02); *A61B 2034/301* (2016.02); *A61B 2034/306* (2016.02)

(58) Field of Classification Search
CPC ............ A61B 1/00147; A61B 1/00148; A61B 1/00149; A61B 1/0016; A61B 34/30; A61B 2034/2055; A61B 2034/301; A61B 2034/306

See application file for complete search history.

(56) References Cited

U.S. PATENT DOCUMENTS

| 5,417,210 A * | 5/1995 | Funda ................. B25J 17/0275 600/109 |
| 2006/0167440 A1* | 7/2006 | Cooper ................. A61B 34/71 606/1 |
| 2007/0013336 A1* | 1/2007 | Nowlin ................. A61B 34/30 318/568.21 |
| 2007/0156122 A1* | 7/2007 | Cooper ................. A61B 90/50 606/1 |
| 2012/0059392 A1* | 3/2012 | Diolaiti ................. A61B 34/30 606/130 |
| 2014/0046340 A1 | 2/2014 | Wilson et al. |
| 2014/0100587 A1 | 4/2014 | Farritor et al. |
| 2014/0128882 A1* | 5/2014 | Kwak ................... A61B 34/30 901/41 |
| 2014/0194699 A1* | 7/2014 | Roh ...................... A61B 17/34 600/249 |
| 2014/0277741 A1 | 9/2014 | Kwon et al. |

(Continued)

FOREIGN PATENT DOCUMENTS

| EP | 3632361 A1 | 4/2020 |
| EP | 3892227 A1 | 10/2021 |

(Continued)

*Primary Examiner* — Ryan N Henderson
(74) *Attorney, Agent, or Firm* — METROLEX IP LAW GROUP, PLLC; Robert L. Scott, Esq.

(57) ABSTRACT

In a surgical robot, a robot controller controls an articulated robot so that an arm base rotationally moves in an arc shape around a predetermined position set at a position away from the arm base.

13 Claims, 14 Drawing Sheets

(56) References Cited

U.S. PATENT DOCUMENTS

| | | |
|---|---|---|
| 2017/0071680 A1 | 3/2017 | Swarup et al. |
| 2018/0036089 A1* | 2/2018 | Nakanishi ............... B25J 15/00 |
| 2018/0036090 A1* | 2/2018 | Hasegawa ............. A61B 34/74 |
| 2018/0071036 A1 | 3/2018 | Farritor et al. |
| 2018/0140377 A1* | 5/2018 | Reichenbach ......... B25J 18/007 |
| 2018/0296285 A1* | 10/2018 | Simi .................... G05B 19/402 |
| 2018/0304389 A1* | 10/2018 | Simi ..................... A61B 17/00 |
| 2018/0360553 A1 | 12/2018 | Nakanishi |
| 2019/0090968 A1 | 3/2019 | Swarup et al. |
| 2019/0167079 A1* | 6/2019 | Inoue .................... A61B 34/30 |
| 2019/0231458 A1* | 8/2019 | DiMaio ................. A61B 17/34 |
| 2020/0085519 A1 | 3/2020 | Farritor et al. |
| 2020/0107890 A1* | 4/2020 | Hashimoto ........... B25J 9/1689 |
| 2020/0107895 A1* | 4/2020 | Hashimoto ........... A61B 34/20 |
| 2020/0205912 A1 | 7/2020 | Wilson et al. |
| 2020/0212763 A1 | 7/2020 | Takata et al. |
| 2020/0289236 A1 | 9/2020 | Shvartsberg et al. |
| 2020/0315738 A1* | 10/2020 | Dewaele ................ A61B 34/71 |
| 2020/0352661 A1* | 11/2020 | Calef ..................... A61B 50/24 |
| 2020/0367982 A1* | 11/2020 | Abbott ................... A61B 34/35 |
| 2021/0338349 A1 | 11/2021 | Farritor et al. |
| 2022/0000569 A1* | 1/2022 | Farritor ................. A61B 34/30 |
| 2022/0039892 A1* | 2/2022 | Waterbury ............ A61B 34/37 |
| 2022/0071718 A1 | 3/2022 | Fukuno et al. |
| 2022/0226057 A1* | 7/2022 | Beckman ......... A61B 17/07207 |
| 2022/0395339 A1* | 12/2022 | Gordon ................. A61B 34/71 |
| 2022/0401168 A1* | 12/2022 | Kwon .................... A61F 9/007 |
| 2023/0012535 A1* | 1/2023 | Tojo ......................... B25J 9/06 |

FOREIGN PATENT DOCUMENTS

| | | |
|---|---|---|
| JP | 2014-180751 A | 9/2014 |
| JP | 2015-526171 A | 9/2015 |
| JP | 2017-104453 A | 6/2017 |
| JP | 2017-513549 A | 6/2017 |
| WO | 2020138032 A1 | 7/2020 |

* cited by examiner

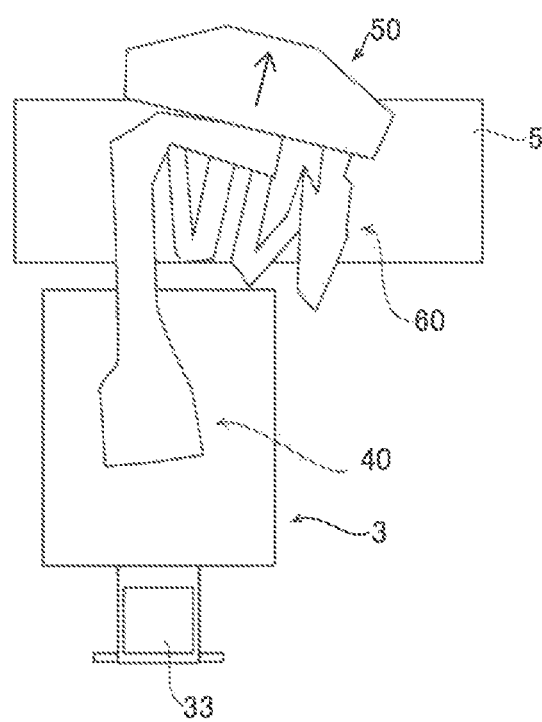

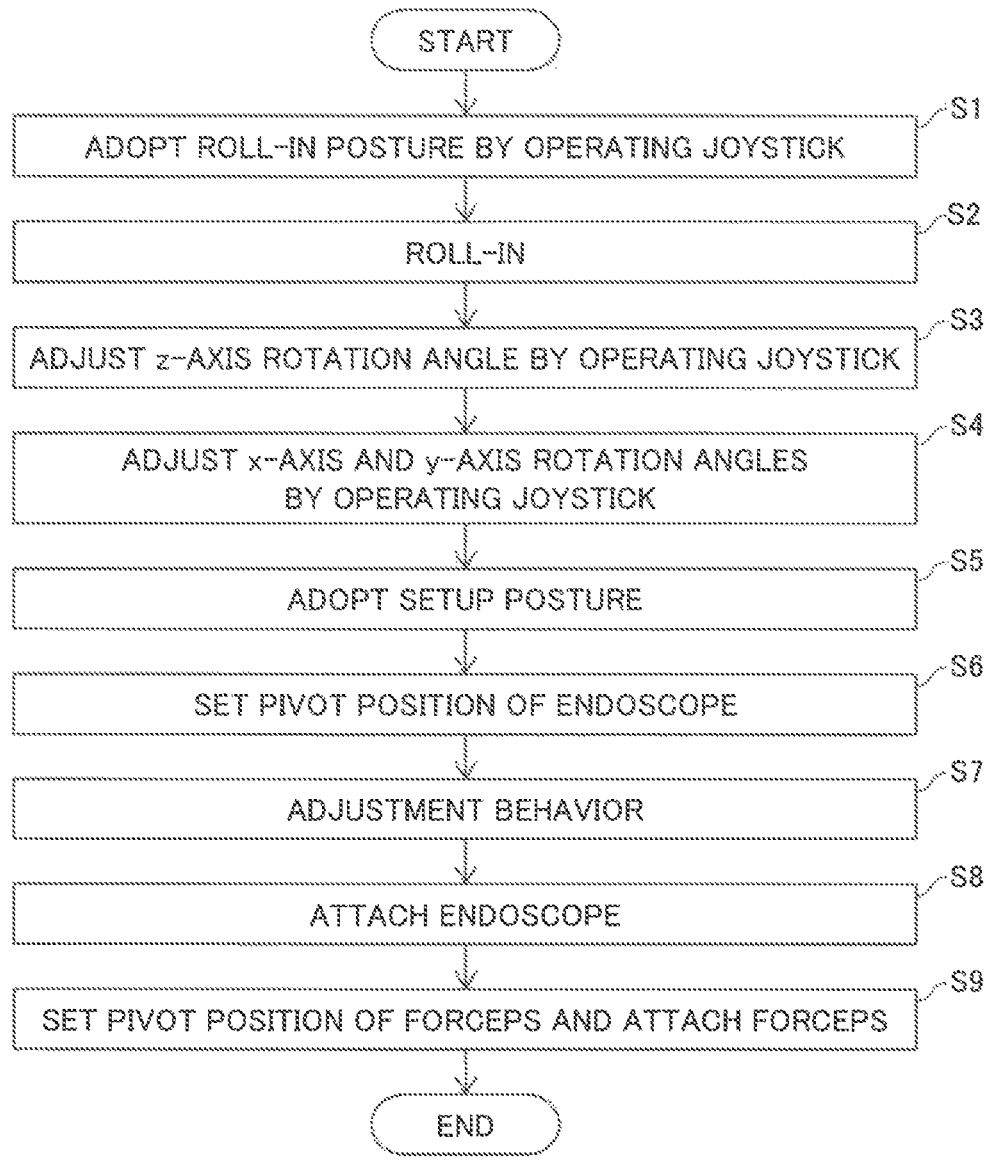

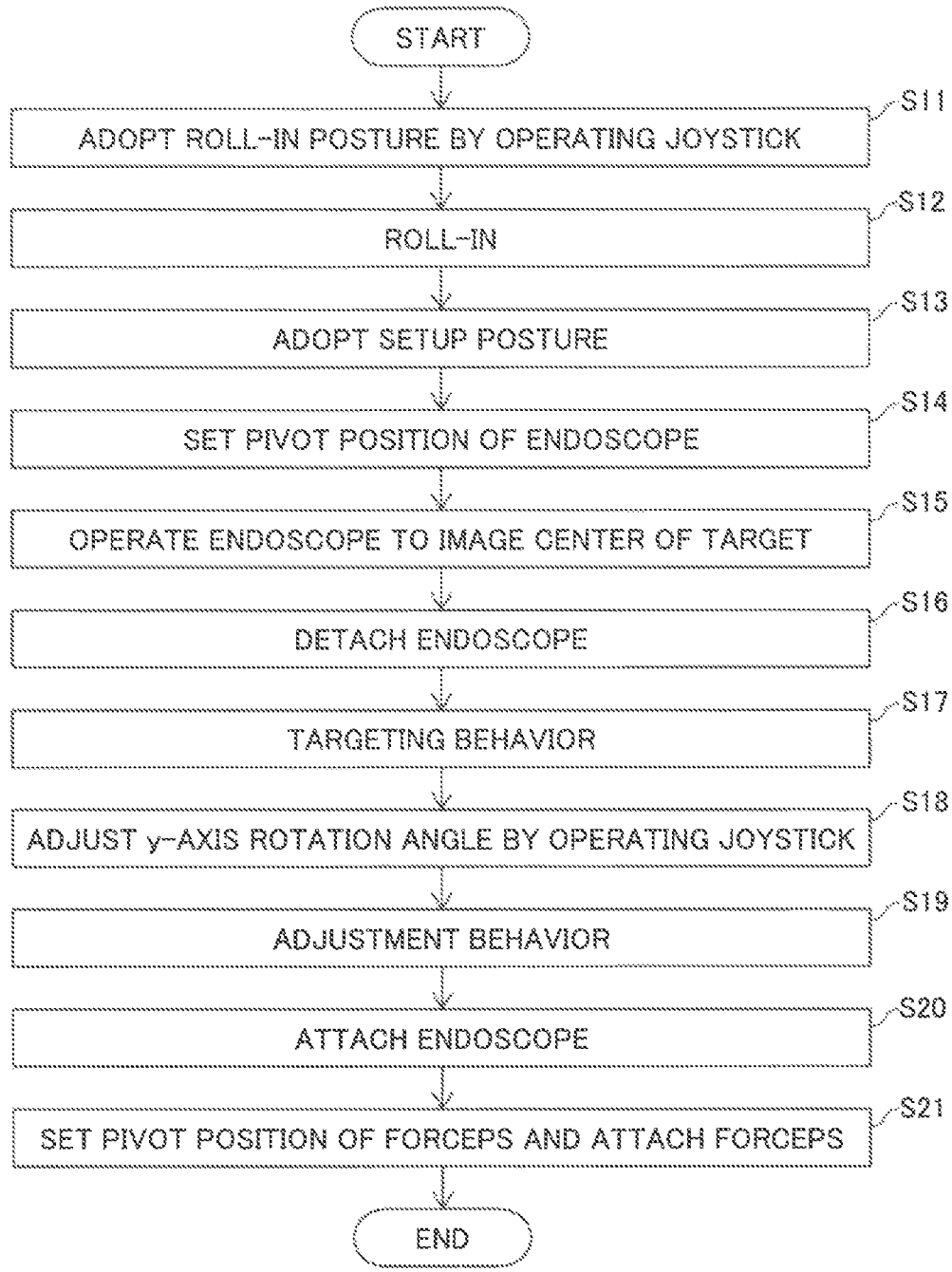

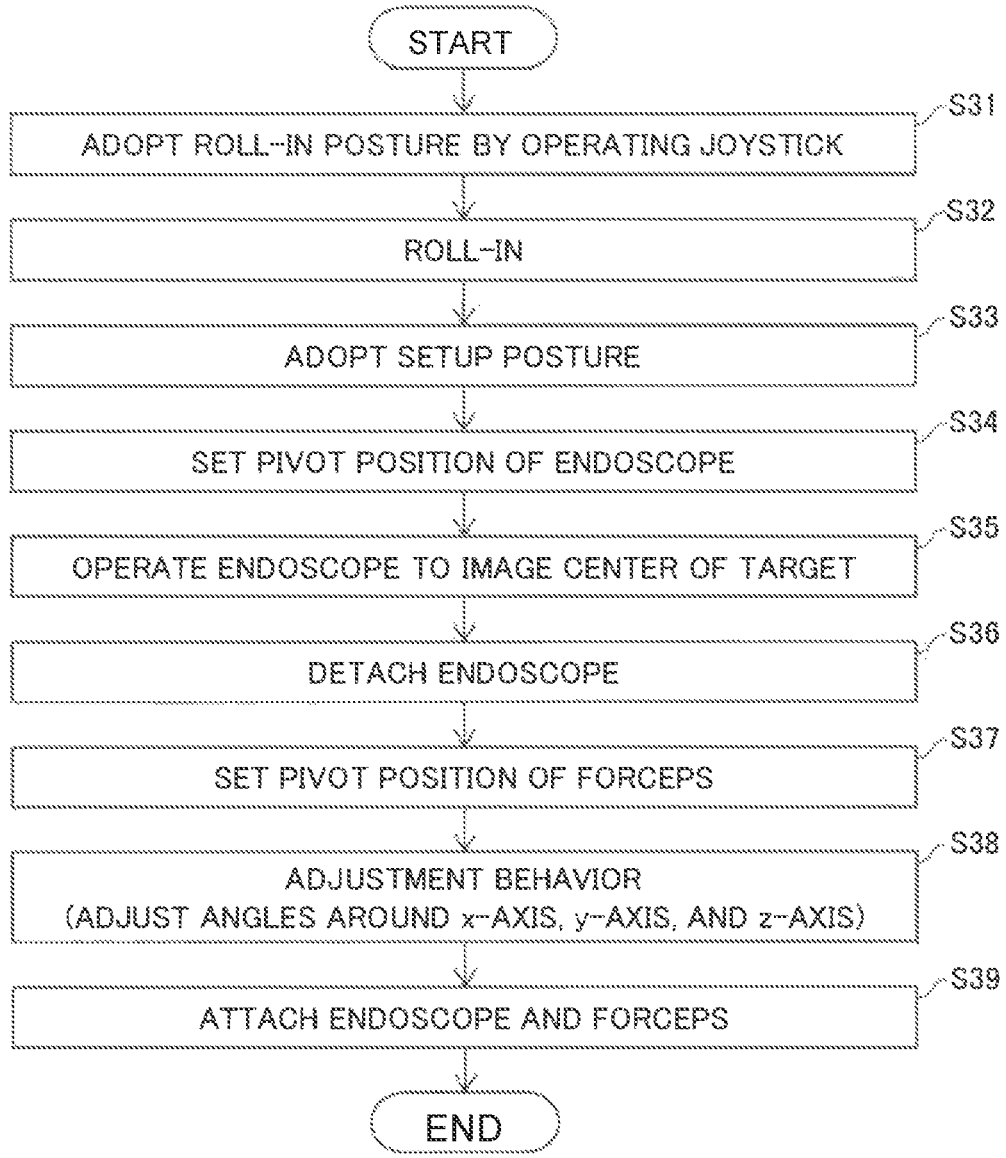

SURGICAL ROBOT AND OPERATION METHOD FOR ARTICULATED ROBOT

CROSS-REFERENCE TO RELATED APPLICATION

The priority application number JP2021-087197, SURGICAL ROBOT AND OPERATION METHOD FOR ARTICULATED ROBOT, filed on May 24, 2021, Takeshi TOJO, and Tetsuo ICHII, upon which this patent application is based, are hereby incorporated by reference.

BACKGROUND OF THE INVENTION

Field of the Invention

This disclosure relates to a surgical robot and an operation method for an articulated robot.

Background Art

In the related art, a surgical robot is known. For example, JP2017-104453 is an example of the related art.

JP2017-104453 discloses a surgical robot including a plurality of arms to which each surgical instrument is attached, a platform to which the plurality of arms are attached, a positioner that moves the platform, and a positioner controller that controls a movement of the positioner. In the surgical robot disclosed in JP2017-104453, the positioner includes a horizontal arm that moves the platform in a horizontal direction. In addition, the platform is connected to a tip of the horizontal arm via a wrist link, and the platform is rotated around a rotation axis in the horizontal direction by the wrist link.

In JP2017-104453, the platform is rotated around the rotation axis in the horizontal direction by the wrist link. In this manner, angles of the plurality of arms can be integrally adjusted. However, when the platform is caused to rotate around a rotational axis in the horizontal direction only by the wrist link at the tip of the horizontal arm, there is a difference between a spatial range in which a tip of the surgical instrument can move in accordance with a surgical procedure and a required surgical field region. Consequently, in some cases, the tip of the surgical instrument may not reach the required surgical field region only by a movement of the arm. Therefore, it is desirable to provide a surgical robot which can adjust the spatial range in which the tip of the surgical instrument can move by integrally moving the plurality of arms to a desired angle and position.

SUMMARY OF THE INVENTION

This disclosure is made to solve the above-described problems, and one object of this disclosure is to provide a surgical robot and an operation method for an articulated robot which can adjust a spatial range in which a tip of a surgical instrument can move by integrally moving a plurality of arms to a desired angle and position.

According to a first aspect, in order to achieve the above-described object, there is provided a surgical robot including a plurality of arms to each of which a surgical instrument is attached, an arm base to which the plurality of arms are attached, an articulated robot having six or more axes and moving the arm base, and a robot controller that controls a movement of the articulated robot. The robot controller controls the articulated robot so that the arm base rotationally moves in an arc shape around a predetermined position set at a position away from the arm base.

In the surgical robot according to the first aspect, as described above, the robot controller controls the articulated robot having six or more axes so that the arm base rotationally moves in the arc shape around a predetermined position set at the position away from the arm base. In this manner, an angle and a position of the arm base can be adjusted by a plurality of joints having six or more axes of the articulated robot. Therefore, a spatial range in which a tip of the surgical instrument can move can be adjusted by integrally moving the plurality of arms to a desired angle and position. In addition, the arm base is caused to rotationally move in the arc shape around the predetermined position set at the position away from the arm base. In this manner, a movement range of the plurality of surgical instruments attached to the plurality of arms can be moved around the predetermined position. In this manner, the movement range of the plurality of surgical instruments can be adjusted to a suitable position corresponding to a surgical procedure or a body shape of a patient.

According to a second aspect, there is provided an operation method for an articulated robot in a surgical robot including a plurality of arms to each of which a surgical instrument is attached, an arm base to which the plurality of arms are attached, the articulated robot having six or more axes and moving the arm base, a robot controller that controls a movement of the articulated robot, and an operation unit that operates the articulated robot. The operation method includes causing the arm base to rotationally move in an arc shape around a predetermined position set at a position away from the arm base only while the operation unit is operated.

In the operation method for the articulated robot according to the second aspect, as described above, the articulated robot having six or more axes causes the arm base to rotationally move in the arc shape around the predetermined position set at the position away from the arm base. In this manner, an angle and a position of the arm base can be adjusted by a plurality of joints having six or more axes of the articulated robot. Therefore, a spatial range in which a tip of the surgical instrument can move can be adjusted by integrally moving the plurality of arms to a desired angle and position. In addition, the arm base is caused to rotationally move in the arc shape around the predetermined position set at the position away from the arm base. In this manner, a movement range of the plurality of surgical instruments attached to the plurality of arms can be moved around the predetermined position. In this manner, the movement range of the plurality of surgical instruments can be adjusted to a suitable position corresponding to a surgical procedure or a body shape of a patient. In addition, the arm base is caused to rotationally move, based on the operation of the operation unit that operates the articulated robot. Therefore, it is possible to prevent the arm base from being unintentionally moved. In addition, the arm base can be operated and moved at a desired timing before a surgery is carried out.

As described above, the spatial range in which the tip of the surgical instrument can be moved can be adjusted by integrally moving the plurality of arms to a desired angle and position.

BRIEF DESCRIPTION OF THE DRAWINGS

FIG. 16 is a view illustrating when the medical manipulator adopts a setup posture.

FIG. 17 is a flowchart illustrating a first example of a posture adjustment procedure.

FIG. 18 is a flowchart illustrating a second example of the posture adjustment procedure.

FIG. 19 is a flowchart illustrating a third example of the posture adjustment procedure.

DETAILED DESCRIPTION OF THE INVENTION

Figure 1:
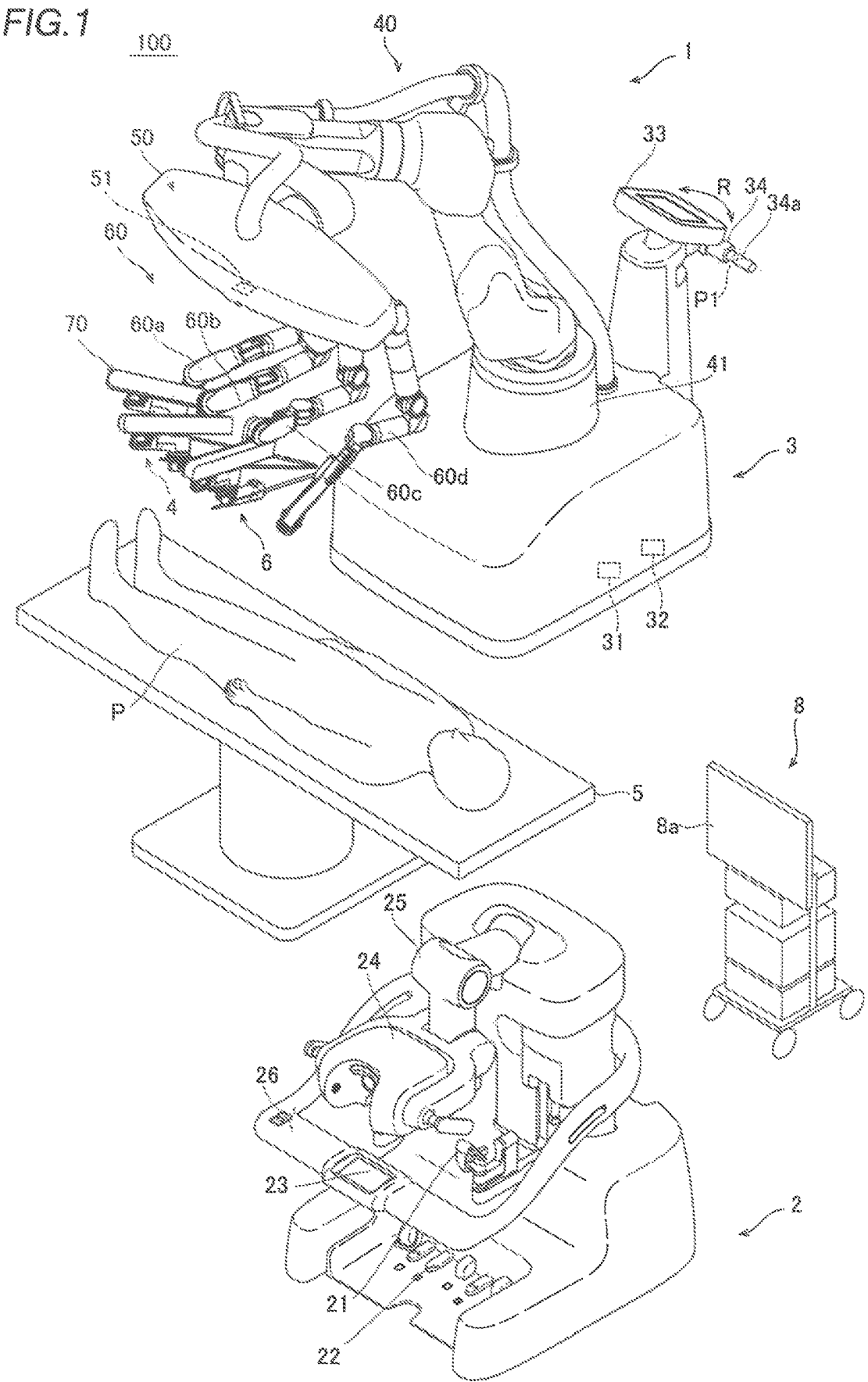
FIG. 1 is a view illustrating a configuration of a robotic surgical system according to an embodiment.

Hereinafter, embodiments will be described with reference to the drawings.

A configuration of a robotic surgical system 100 according to the embodiment will be described with reference to FIGS. 1 to 16. The robotic surgical system 100 includes a medical manipulator 1 serving as a patient P-side apparatus, and a remote control apparatus 2 serving as a operator-side apparatus for operating the medical manipulator 1. The medical manipulator 1 includes a medical cart 3, and is movable. The remote control apparatus 2 is disposed at a position separated from the medical manipulator 1, and the medical manipulator 1 is remotely controlled by the remote control apparatus 2. An operator inputs a command for causing the medical manipulator 1 to perform a desired movement to the remote control apparatus 2. The remote control apparatus 2 transmits the input command to the medical manipulator 1. The medical manipulator 1 is moved, based on the received command. In addition, the medical manipulator 1 is disposed in a surgery room which is a sterile field. The medical manipulator 1 is an example of a surgical robot.

For example, the remote control apparatus 2 is disposed inside or outside the surgery room. The remote control apparatus 2 includes an operation-purpose manipulator arm 21, an operation pedal 22, a touch panel 23, a monitor 24, a support arm 25, and a support bar 26. The operation-purpose manipulator arm 21 forms an operation handle for an operator to input a command. The operation-purpose manipulator arm 21 receives an operation amount for a surgical instrument 4. The monitor 24 is a scope type display that displays an image captured by an endoscope 6. The support arm 25 supports the monitor 24 so that a height of the monitor 24 is aligned with a height of the operator's face. The touch panel 23 is disposed in the support bar 26. A sensor provided in the vicinity of the monitor 24 detects a head portion of the operator. In this manner, the medical manipulator 1 can be operated by the remote control apparatus 2. The operator operates the operation-purpose manipulator arm 21 and the operation pedal 22 while visibly recognizing an affected area through the monitor 24. In this manner, a command is input to the remote control apparatus 2. The command input to the remote control apparatus 2 is transmitted to the medical manipulator 1.

The medical cart 3 is provided with a controller 31 that controls a movement of the medical manipulator 1 and a storage 32 that stores a program for controlling the movement of the medical manipulator 1. The controller 31 of the medical cart 3 controls the operation of the medical manipulator 1, based on the command input to the remote control apparatus 2.

The medical cart 3 is provided with an operation unit 33. In order to prepare a surgery mainly before a surgery, the operation unit 33 receives operations for movements or posture changes of a vertical articulated robot 40, an arm base 50, and a plurality of arms 60. The operation unit 33 includes a joystick. The vertical articulated robot 40 is an example of an articulated robot.

Figure 2:
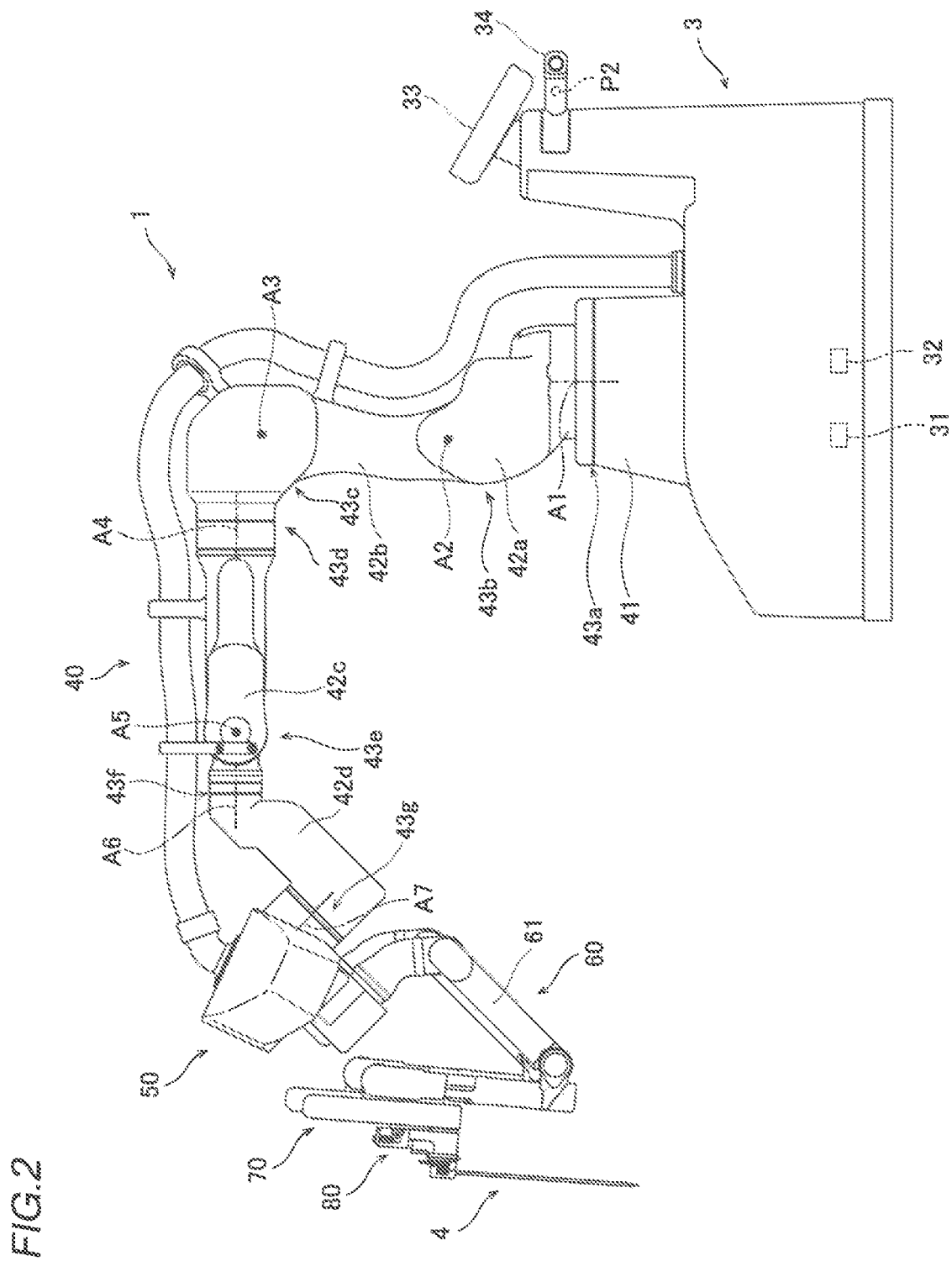
FIG. 2 is a view illustrating a configuration of a medical manipulator according to the embodiment.

The medical manipulator 1 illustrated in FIGS. 1 and 2 is disposed in the surgery room. As illustrated in FIG. 1, the medical manipulator 1 carries out a surgery for a patient P on a surgery table 5. The medical manipulator 1 includes the medical cart 3, the vertical articulated robot 40, the arm base 50, and the plurality of arms 60. The arm base 50 is attached to a tip of the vertical articulated robot 40. The plurality of arms 60 are attached to the arm base 50. The arm base 50 has an elongated shape. In addition, in an arm 60a and an arm 60d in both ends of the arm 60, each root portion of the arms is connected to a slide belt in the arm base 50. The slide belt is laid between a plurality of pulleys provided in the arm base 50 and a drive motor, and the slide belt translates to move the root portions of the arm 60a and the arm 60d in both ends. That is, the arm base 50 can adjust an interval between the plurality of arms 60, based on a command from the controller 31. In addition, the plurality of arms 60 can adopt a folded storage posture. The arm base 50 and the plurality of arms 60 are used by being covered with a sterile drape.

An imaging device 51 that captures an image when adjusting a position of the arm base 50 is attached to the arm base 50. The imaging device 51 captures an image of a lower portion of the arm base 50. The image captured by the imaging device 51 is displayed on a display provided in the medical cart 3 and a display 8a of a monitor cart 8.

The vertical articulated robot 40 is an articulated robot having six or more axes. For example, the vertical articulated robot 40 is a seven-axis articulated robot. In addition, the vertical articulated robot 40 is disposed on the medical cart 3. The vertical articulated robot 40 moves the arm base 50. Specifically, the vertical articulated robot 40 three-dimensionally moves a position of the arm base 50.

As illustrated in FIG. 2, the vertical articulated robot 40 includes a base portion 41 and a plurality of link portions 42a, 42b, 42c, and 42d connected to the base portion 41. The plurality of link portions 42a, 42b, 42c, and 42d are connected by joints 43a, 43b, 43c, 43d, 43e, 43f, and 43g.

The joint 43a rotates the link portion 42a around a rotation axis A1 in a vertical direction with respect to the base portion 41. The joint 43b rotates the link portion 42b around a rotation axis A2 in a horizontal direction with respect to the link portion 42a. The joint 43c rotates the link portion 42c around a rotation axis A3 in the horizontal direction with respect to the link portion 42b. The joint 43d rotates the link portion 42c around a rotation axis A4 perpendicular to the rotation axis A3 with respect to the joint 43c. The joint 43e rotates the link portion 42d around a rotation axis A5 perpendicular to the rotation axis A4 with respect to the link portion 42c. The joint 43f rotates the link portion 42d around a rotation axis A6 perpendicular to the rotation axis A5 with respect to the joint 43e. The joint 43g rotates the arm base 50 around a rotation axis A7 with respect to the link portion 42d.

As illustrated in FIG. 1, the surgical instrument 4 is attached to each tip of the plurality of arms 60. For example, the surgical instrument 4 includes a replaceable instrument and the endoscope 6 (refer to FIG. 6).

Figure 3:
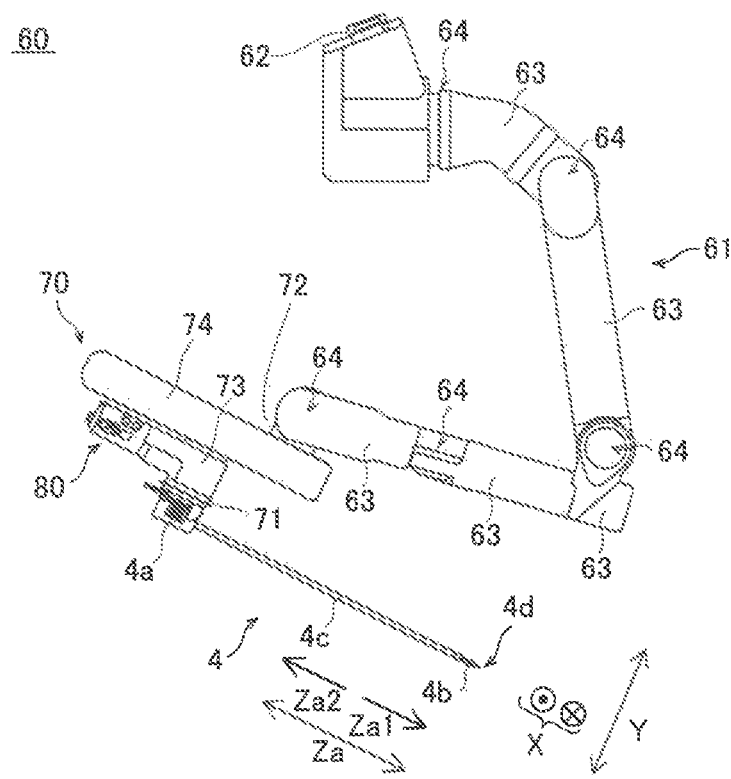
FIG. 3 is a view illustrating a configuration of an arm of the medical manipulator according to the embodiment.

As illustrated in FIG. 3, the instrument is provided with a driven unit 4a driven by a servomotor M2 provided in a holder 71 of the arm 60. In addition, a forceps 4b is provided at a tip of the instrument as an example of an end effector. As instruments having joints, the end effector includes forceps, scissors, a glass bar, a needle holder, a microdissector, a stable applier, a tacker, a suction cleaning tool, a snare wire, and a clip applier. In addition, as instruments having no joint, the end effector includes a cutting blade, a cautery probe, a washer, a catheter, and a suction orifice. The forceps 4b has two end effector members 4b1 and 4b2.

Figure 4:
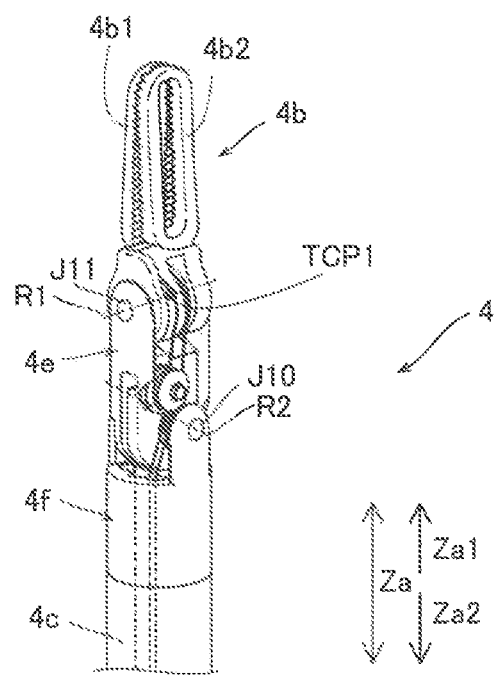
FIG. 4 is a view illustrating forceps.

As illustrated in FIG. 4, the instrument includes a first support body 4e that supports a base end side of the end effector members 4b1 and 4b2 to be rotatable around a J11-axis, a second support body 4f that supports a base end side of the first support body 4e to be rotatable around a J10-axis, and a shaft 4c connected to a base end side of the second support body 4f. The driven unit 4a, the shaft 4c, the second support body 4f, the first support body 4e, and the forceps 4b are disposed along a Za-direction. The J11-axis is orthogonal to the Za-direction which is an extending direction of the shaft 4c. In addition, the J10-axis is separated from the J11-axis in the extending direction of the shaft 4c, and is orthogonal to the extending direction of the shaft 4c and the J11-axis.

The forceps 4b is attached to the first support body 4e to rotate around a rotation axis R1 of the J11-axis. In addition, the second support body 4f supports the first support body 4e to be rotatable around the J10-axis. That is, the first support body 4e is attached to the second support body 4f to rotate around a rotation axis R2 of the J10-axis. In addition, a portion on a side in the Za1-direction, which is a tip side of the first support body 4e, has a U-shape. A tool center point (TCP1) is set in a central portion in a direction of the rotation axis R1 of a tip side portion having the U-shape of the first support body 4e.

Figure 6:
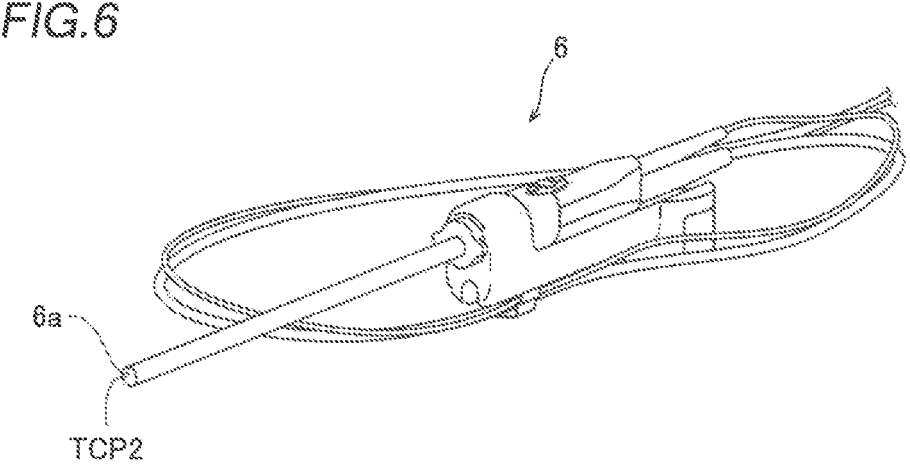
FIG. 6 is a view illustrating an endoscope.

As illustrated in FIG. 6, a TCP2 of the endoscope 6 is set at the tip of the endoscope 6. The endoscope 6 is attached to the tip side of the arm 60, and captures an image of a surgical site. For example, the endoscope 6 has a stereo camera, and can capture an image of the surgical site as a 3D image.

Next, a configuration of the arm 60 will be described in detail.

As illustrated in FIG. 3, the arm 60 includes an arm unit 61 having a base portion 62, a link portion 63, and a joint 64, and a translational mechanism 70 provided at the tip of the arm unit 61. The arm 60 three-dimensionally moves the tip side with respect to the arm base 50 on a root side of the arm 60. The plurality of arms 60 have configurations the same as each other.

The translational mechanism 70 is provided on the tip side of the arm unit 61, and the surgical instrument 4 is attached to the translational mechanism 70. In addition, the translational mechanism 70 translates the surgical instrument 4 in a direction of inserting the surgical instrument 4 into the patient P. In addition, the translational mechanism 70 relatively translates the surgical instrument 4 with respect to the arm unit 61. Specifically, the translational mechanism 70 is provided with a holder 71 that holds the surgical instrument 4. A servomotor M2 (refer to FIG. 9) is accommodated in the holder 71. The servomotor M2 rotates a rotor provided in the driven unit 4a of the surgical instrument 4. The forceps 4b is moved by rotating the rotor of the driven unit 4a.

The arm unit 61 includes a seven-axis articulated robot arm. In addition, the arm unit 61 includes the base portion 62 for attaching the arm unit 61 to the arm base 50, and a plurality of the link portions 63 connected to the base portion 62. The plurality of link portions 63 are connected to each other by the joints 64. In addition, the arm 60 does not include a mechanism for holding a trocar T.

The translational mechanism 70 translates the holder 71 along the Za-direction so that the translational mechanism 70 translates the surgical instrument 4 attached to the holder 71 along the Za-direction which is the extending direction of the shaft 4c. Specifically, the translational mechanism 70 includes a base end side link portion 72 connected to the tip of the arm unit 61, a tip side link portion 73, and a connection link portion 74 provided between the base end side link portion 72 and the tip side link portion 73. In addition, the holder 71 is provided in the tip side link portion 73.

The connection link portion 74 of the translational mechanism 70 is a double speed mechanism that relatively moves the tip side link portion 73 with respect to the base end side link portion 72 along the Za-direction. In addition, the tip side link portion 73 is relatively moved along the Za-direction with respect to the base end side link portion 72. In this manner, the surgical instrument 4 provided in the holder 71 is translated along the Za-direction. In addition, the tip of the arm unit 61 is connected to the base end side link portion 72 so that the base end side link portion 72 rotates around an X-direction orthogonal to the Za-direction.

Figure 5:
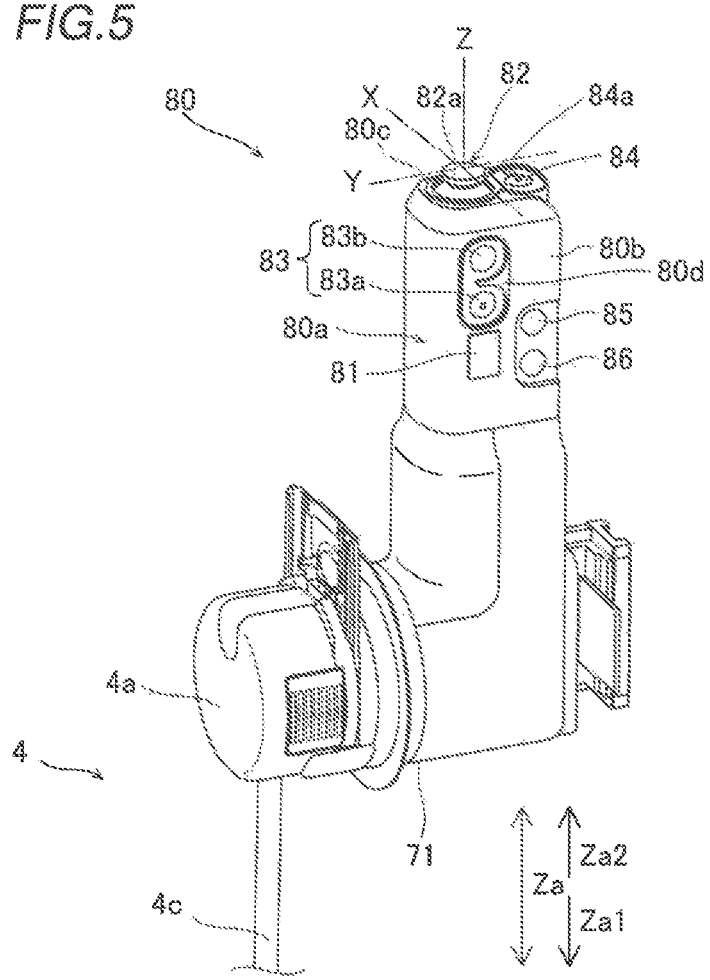
FIG. 5 is a perspective view illustrating a configuration of an operation unit of the medical manipulator according to the embodiment.

In addition, as illustrated in FIG. 5, the medical manipulator 1 includes an operation unit 80 attached to the arm 60 to operate the arm 60. The operation unit 80 includes an enable switch 81, a joystick 82, and a switch unit 83. The enable switch 81 allows or does not allow the arm 60 to be moved by the joystick 82 and the switch unit 83. In addition, the enable switch 81 is in a state of allowing the surgical instrument 4 to be moved by the arm 60 when an operator such as a nurse or an assistant grips and presses the operation unit 80. In addition, a pair of enable switches 81 are provided on both sides of an outer peripheral surface 80a of the operation unit 80. The joystick 82 receives an operation in a movement direction of the arm 60.

The switch unit 83 includes a switch unit 83a for moving the surgical instrument 4 to a side in a direction of inserting the surgical instrument 4 into the patient P along a longitudinal direction of the surgical instrument 4, and a switch unit 83b for moving the surgical instrument 4 to a side opposite to the direction of inserting the surgical instrument 4 into the patient P. Both the switch unit 83a and the switch unit 83b include a push button switch. The switch units 83 are provided on both sides of the outer peripheral surface 80a of the operation unit 80. Specifically, a pair of the switch unit 83a and the switch unit 83b are provided on both side surfaces of the operation unit 80.

As illustrated in FIG. 5, the operation unit 80 includes a pivot button 85 to set a pivot position PP serving as a fulcrum (refer to FIG. 8) for the movement of the surgical instrument 4 attached to the arm 60. The pivot button 85 is provided on a surface 80b of the operation unit 80 to be adjacent to the enable switch 81. In a state where a tip portion 6a of the endoscope 6 (refer to FIG. 6) or a tip portion 7a of a pivot position teaching instrument 7 (refer to FIG. 7) is moved to a position corresponding to an insertion position of the trocar T inserted into the body surface S of the patient P, the pivot button 85 is pressed. In this manner, the pivot position PP is set and stored in the storage 32. When the pivot position PP is set, one point is set as coordinates of the pivot position PP. When the pivot position PP is set, a direction of the surgical instrument 4 is not set. A pair of pivot buttons 85 are provided on both sides of the outer peripheral surface 80a of the operation unit 80. The pivot button 85 is an example of a pivot position setting switch.

Figure 7:
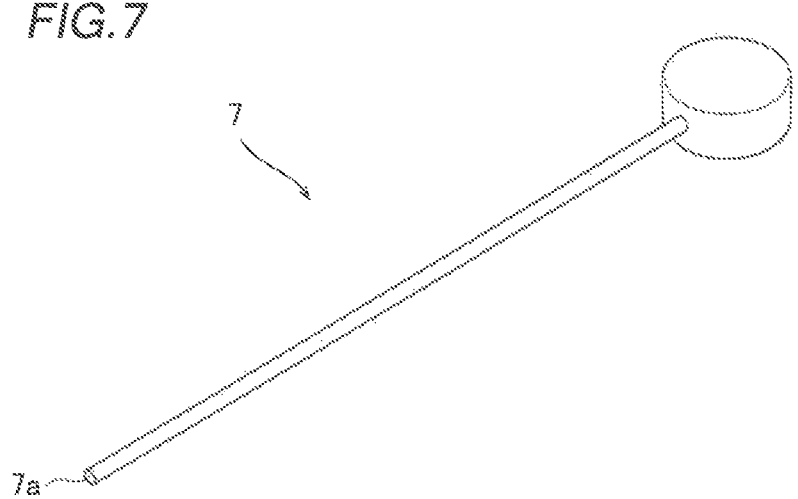
FIG. 7 is a view illustrating a pivot position teaching instrument.
Figure 8:
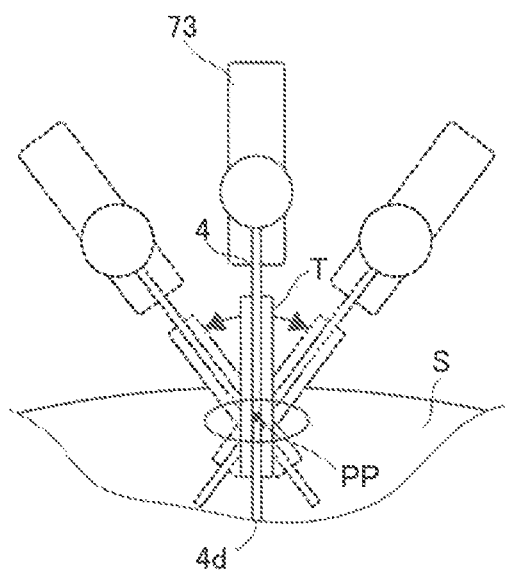
FIG. 8 is a view illustrating a pivot position.

As illustrated in FIG. 7, a pivot position teaching instrument 7 points to the pivot position PP (refer to FIG. 8), attached to the tip side of the arm 60 and serving as a fulcrum for moving the surgical instrument 4.

As illustrated in FIG. 1, the endoscope 6 is attached to one arm 60c of the plurality of arms 60, and the surgical instruments 4 other than the endoscope 6 are attached to the remaining arms 60a, 60b, and 60d. Specifically, during a surgery, the endoscope 6 is attached to one arm 60 of the four arms 60, and the surgical instruments 4 other than the endoscope 6 are attached to the three arms 60. A pivot position PP1 is set to the arm 60 to which the endoscope 6 is attached in a state where the endoscope 6 is attached. In addition, a pivot position PP2 is set to the arm 60 to which the surgical instruments 4 other than the endoscope 6 are attached in a state where the pivot position teaching instrument 7 is attached. The endoscope 6 is attached to one of the two arms 60b and 60c disposed in the center of the four arms 60 disposed adjacent to each other. That is, the pivot position PP is individually set for each of the plurality of arms 60.

As illustrated in FIG. 5, an adjustment button 86 for optimizing the position of the arm 60 is provided on the surface 80b of the operation unit 80. After the pivot position PP is set to the arm 60 to which the endoscope 6 is attached, the positions of the other arm 60 and the arm base 50 are optimized by pressing the adjustment button 86. A pair of adjustment buttons 86 are provided on both sides of the outer peripheral surface 80a of the operation unit 80.

As illustrated in FIG. 5, the operation unit 80 includes a mode switching button 84 for switching between a mode for translating the surgical instrument 4 or the endoscope 6 attached to the arm 60 and a mode for rotationally moving the arm 60. In addition, a mode indicator 84a is provided in the vicinity of the mode switching button 84. The mode indicator 84a displays a switched mode. Specifically, when the mode indicator 84a is turned on, a current mode is displayed as a rotational movement mode. In addition, when the mode indicator 84a is turned off, the current mode is displayed as a translational mode.

The mode indicator 84a also serves as a pivot position indicator for displaying that the pivot position PP is set.

In the mode of translating the arm 60, the arm 60 is moved so that a tip 4d of the surgical instrument 4 moves on an X-Y plane. In addition, in the mode for rotationally moving the arm 60, when the pivot position PP is not set, the arm 60 is rotationally moved around the forceps 4b. When the pivot position PP is set, the arm 60 is moved so that the surgical instrument 4 is rotationally moved about the pivot position PP. The surgical instrument 4 is rotationally moved in a state where the shaft 4c of the surgical instrument 4 is inserted into the trocar T.

Figure 9:
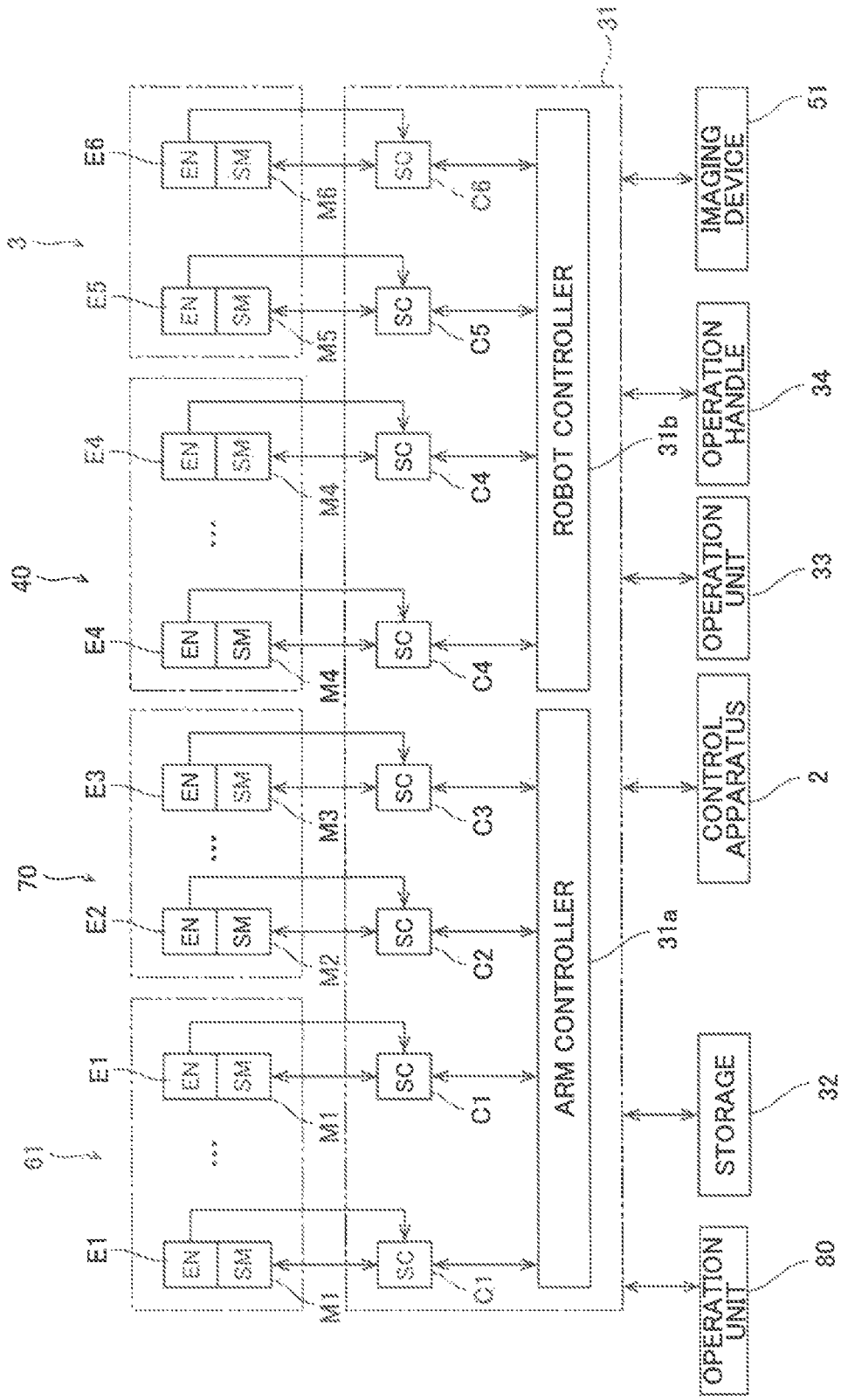
FIG. 9 is a block diagram illustrating a configuration of a controller of the medical manipulator according to the embodiment.

As illustrated in FIG. 9, the arm 60 is provided with a plurality of servomotors M1, an encoder E1, and a speed reducer to correspond to the plurality of joints 64 of the arm unit 61. The encoder E1 detects a rotation angle of the servomotor M1. The speed reducer reduces a rotation speed of the servomotor M1 to increase a torque.

As illustrated in FIG. 9, the translational mechanism 70 includes a servomotor M2 for rotating a rotor provided in the driven unit 4a of the surgical instrument 4, a servomotor M3 for translating the surgical instrument 4, an encoder E2 and an encoder E3, and a speed reducer. The encoder E2 and the encoder E3 respectively detect rotation angles of the servomotor M2 and the servomotor M3. The speed reducer reduces rotation speeds of the servomotor M2 and the servomotor M3 to increase a torque.

The vertical articulated robot 40 is provided with a plurality of servomotors M4, an encoder E4, and a speed reducer to correspond to the plurality of joints 43 of the vertical articulated robot 40. The encoder E4 detects a rotation angle of the servomotor M4. The speed reducer reduces a rotation speed of the servomotor M4 to increase a torque.

The medical cart 3 is provided with a servomotor M5 for driving each of a plurality of front wheels of the medical cart 3, an encoder E5, a speed reducer, and a brake. The encoder E5 detects a rotation angle of the servomotor M5. The speed reducer reduces a rotation speed of the servomotor M5 to increase a torque.

A throttle portion 34a of the medical cart 3 is provided with a potentiometer P1 (refer to FIG. 1), and the servomotor M5 of a front wheel is driven, based on a rotation angle detected by the potentiometer P1 in response to twist of the throttle portion 34a. In addition, a rear wheel of the medical cart 3 is a twin-wheel type, and the rear wheel is steered, based on the rightward-leftward (R-direction) operating of an operation handle 34. In addition, the operation handle 34 of the medical cart 3 is provided with a potentiometer P2 (refer to FIG. 2), and the rear wheel of the medical cart 3 is provided with a servomotor M6, an encoder E6, and a speed reducer. The speed reducer reduces a rotation speed of the servomotor M6 to increase a torque. The servomotor M6 is driven, based on a rotation angle detected by the potentiometer P2 in response to the rightward-leftward (R-direction) operating of the operation handle 34. That is, steering of the rear wheel in the rightward-leftward (R-direction) operating of the operation handle 34 is power-assisted by the servomotor M6.

The medical cart 3 moves in a forward-rearward direction by driving the front wheel. In addition, since the operation handle 34 of the medical cart 3 rotates, the rear wheel is steered, and the medical cart 3 moves in a rightward-leftward direction.

The controller 31 of the medical cart 3 includes an arm controller 31a that controls the movement of the plurality of arms 60, based on a command, and a robot controller 31b that controls the movement of the vertical articulated robot 40 and driving of the front wheel and the rear wheel of the medical cart 3, based on the command. A servo controller C1 for controlling the servomotor M1 to drive the arm 60 is electrically connected to the arm controller 31a. In addition, an encoder E1 for detecting the rotation angle of the servomotor M1 is electrically connected to the servo controller C1.

A servo controller C2 for controlling the servomotor M2 to drive the surgical instrument 4 is electrically connected to the arm controller 31a. In addition, an encoder E2 for detecting the rotation angle of the servomotor M2 is electrically connected to the servo controller C2. In addition, a servo controller C3 for controlling the servomotor M3 to translate the translational mechanism 70 is electrically connected to the arm controller 31a. In addition, an encoder E3 for detecting the rotation angle of the servomotor M3 is electrically connected to the servo controller C3.

A movement command input to the remote control apparatus 2 is input to the arm controller 31a. The arm controller 31a generates a position command, based on the input movement command and the rotation angle detected by the encoder E1 (E2, E3), and outputs the position command to the servo controller C1 (C2, C3). The servo controller C1 (C2, C3) generates a torque command, based on the position command input from the arm controller 31a and the rotation angle detected by the encoder E1 (E2, E3), and outputs the torque command to the servomotors M1 (M2, M3). In this manner, the arm 60 moves in response to the movement command input to the remote control apparatus 2.

The arm controller 31a operates the arm 60, based on an input signal from the joystick 82 of the operation unit 80. Specifically, the arm controller 31a generates the position command, based on a movement command which is an input signal input from the joystick 82, and the rotation angle detected by the encoder E1, and outputs the position command to the servo controller C1. The servo controller C1 generates a torque command, based on the position command input from the arm controller 31a and the rotation angle detected by the encoder E1, and outputs the torque command to the servomotor M1. In this manner, the arm 60 moves in response to the movement command input to the joystick 82.

The arm controller 31a operates the arm 60, based on the input signal from the switch unit 83 of the operation unit 80. Specifically, the arm controller 31a generates the position command, based on the movement command which is the input signal input from the switch unit 83 and the rotation angle detected by the encoder E1 or E3, and outputs the position command to the servo controller C1 or C3. The servo controller C1 or C3 generates the torque command, based on the position command input from the arm controller 31a and the rotation angle detected by the encoder E1 or E3, and outputs the torque command to the servomotor M1 or M3. In this manner, the arm 60 moves in response to the movement command input to the switch unit 83.

The robot controller 31b controls the movement of the vertical articulated robot 40. Specifically, as illustrated in FIG. 9, the servo controller C4 for controlling the servomotor M4 to move the vertical articulated robot 40 is electrically connected to the robot controller 31b. In addition, an encoder E4 for detecting the rotation angle of the servomotor M4 is electrically connected to the servo controller C4. In addition, the servo controller C5 for controlling the servomotor M5 to drive the front wheel of the medical cart 3 is electrically connected to the robot controller 31b. In addition, the encoder E5 for detecting the rotation angle of the servomotor M5 is electrically connected to the servo controller C5. In addition, the servo controller C6 for controlling the servomotor M6 to drive the rear wheel of the medical cart 3 is electrically connected to the robot controller 31b. In addition, the encoder E6 for detecting the rotation angle of the servomotor M6 is electrically connected to the servo controller C6.

The movement command from the operation unit 33 is input to the robot controller 31b. The robot controller 31b generates the position command, based on the movement command input from the operation unit 33 and the rotation angle detected by the encoder E4, and outputs the position command to the servo controller C4. The servo controller C4 generates the torque command, based on the position command input from the robot controller 31b and the rotation angle detected by the encoder E4, and outputs the torque command to the servomotor M4. In this manner, the vertical articulated robot 40 moves in response to the movement command input to the operation unit 33. Although detailed description will be omitted, through the same procedure, the robot controller 31b moves the medical cart 3 in response to the movement command from the operation handle 34.

As illustrated in FIG. 1, the robotic surgical system 100 is provided with the monitor cart 8. The monitor cart 8 includes the display 8a. The same image as the image displayed on the monitor 24 of the remote control apparatus 2 is displayed on the display 8a of the monitor cart 8. That is, the image displayed on the monitor 24 and viewed by an operator can be viewed through the display 8a of the monitor cart 8 by operators such as nurses and assistants present around the medical manipulator 1 and the patient P Here, in the present embodiment, as illustrated in FIGS. 10 and 11, the robot controller 31b controls the vertical articulated robot 40 so that the arm base 50 rotationally moves in an arc shape around a predetermined position PA set at a position away from the arm base 50.

Figure 13:
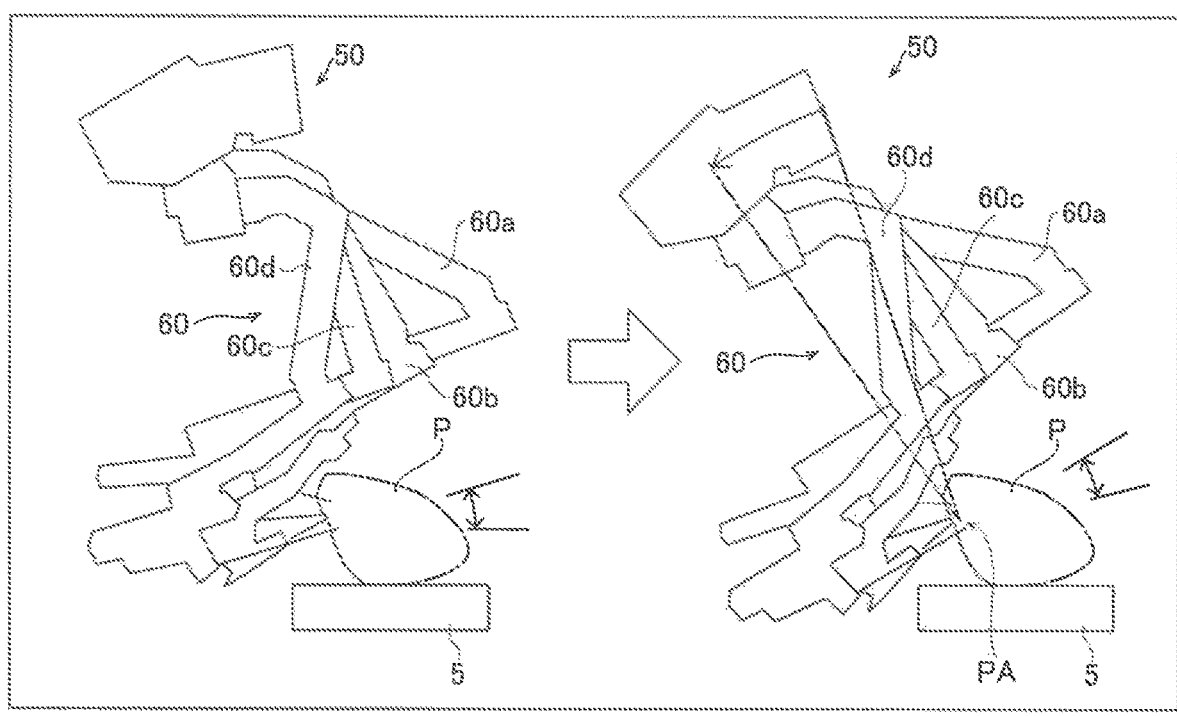
FIG. 13 is a view illustrating a rotationally moving example of the arm base in the forward-rearward direction.

The robot controller 31b can control the vertical articulated robot 40 so that the arm base 50 rotationally moves in the arc shape around a rotational axis passing through the predetermined position PA. Specifically, as illustrated in FIG. 11, the robot controller 31b controls the vertical articulated robot 40 so that the arm base 50 rotationally moves in the arc shape around a first rotational axis B1 passing through the predetermined position PA and parallel to a direction in which the plurality of arms 60 are aligned on the arm base 50. As illustrated in FIG. 13, a movable range of the surgical instrument 4 can be increased by causing the arm base 50 to rotationally move around the first rotational axis B1. In FIG. 11, the first rotational axis B1 is perpendicular to the paper surface.

Figure 10:
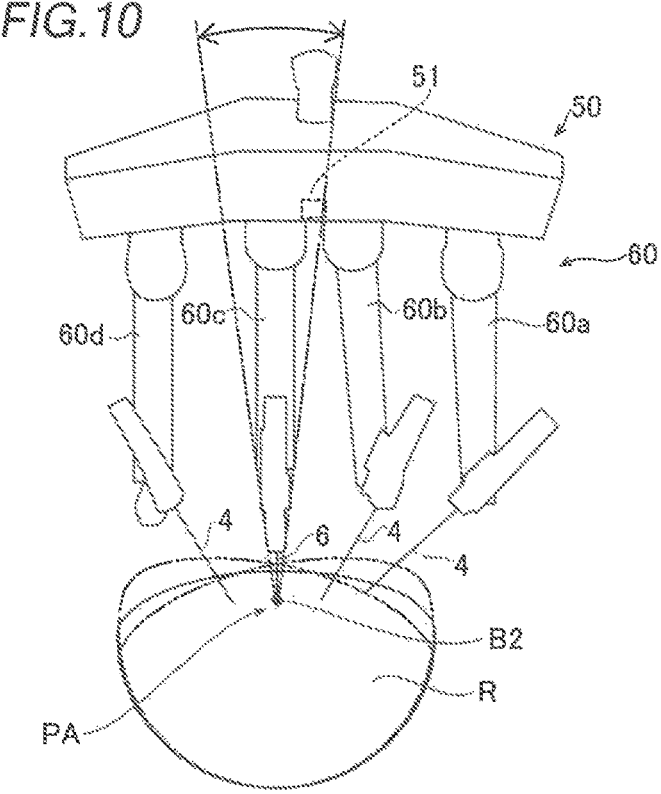
FIG. 10 is a view illustrating rotationally moving of an arm base in a lateral direction.
Figure 11:
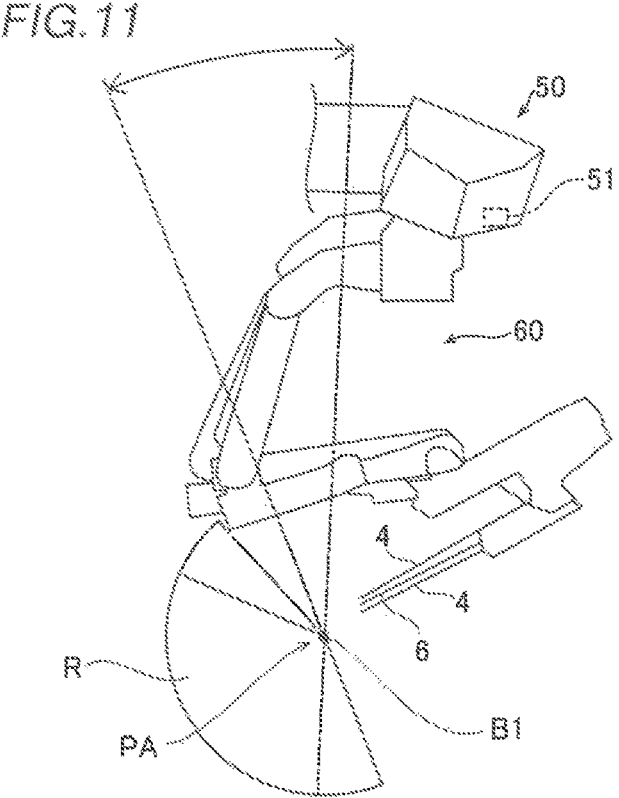
FIG. 11 is a view illustrating rotationally moving of the arm base in a forward-rearward direction.
Figure 12:
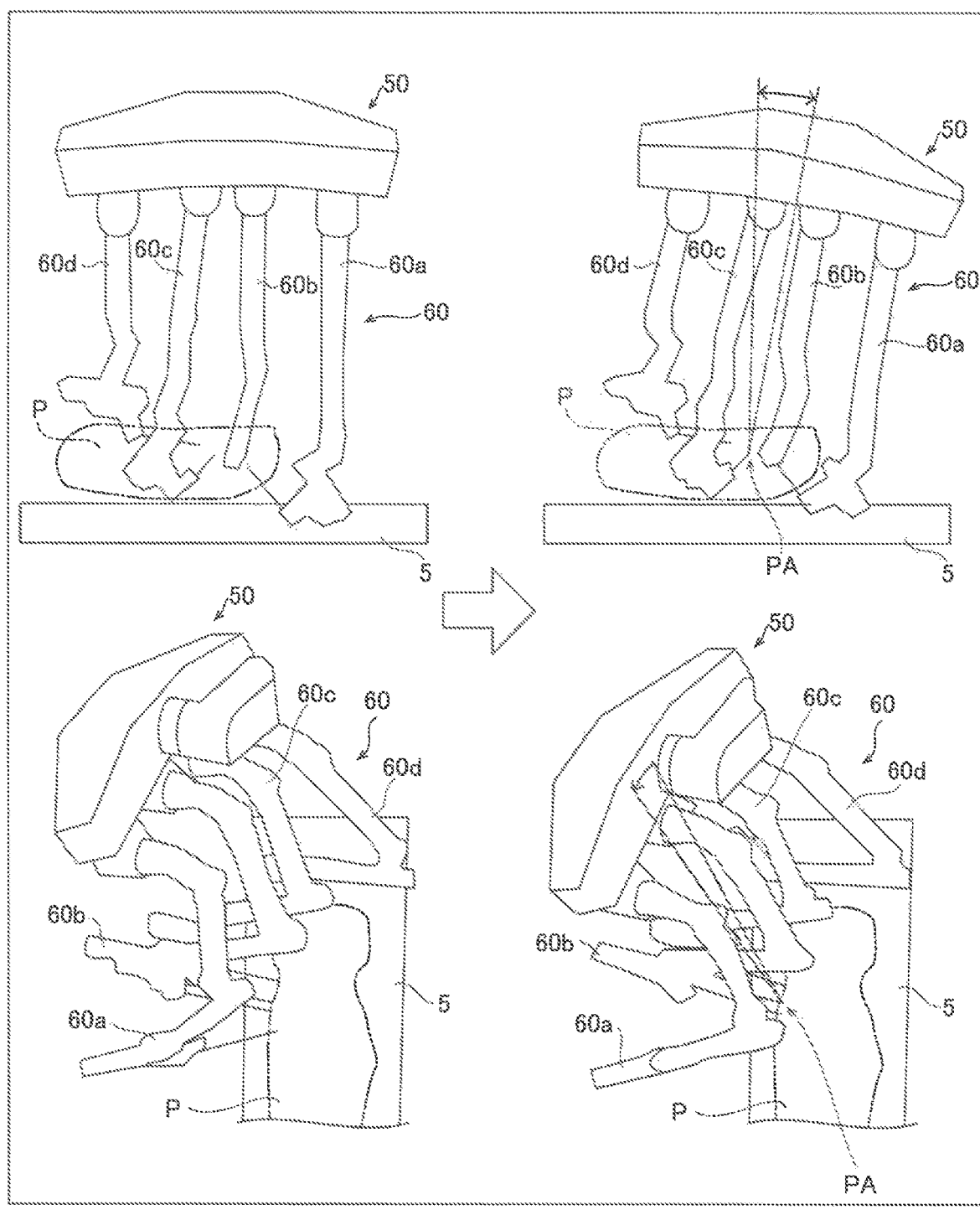
FIG. 12 is a view illustrating a rotationally moving example of the arm base in the lateral direction.

As illustrated in FIG. 10, the robot controller 31b can control the vertical articulated robot 40 so that the arm base 50 rotationally moves in the arc shape around a second rotational axis B2 passing through the predetermined position PA by and existing in a vertical plane orthogonal to the first rotational axis B1. As illustrated in FIG. 12, since the arm base 50 is caused to rotationally move around the second rotational axis B2, it is possible to prevent the arm 60a from being in an extended posture. Therefore, a movable range of the arm 60a can be increased. Here, when the joint of the arm 60a is in an extended state, the movement may be restricted in some cases. On the other hand, the joint of the arm 60a is not in an extended state by causing the arm base 50 to rotationally move around the second rotational axis B2. Therefore, the arm 60a can adopt a desired posture without restricting the movement of the arm 60a. In FIG. 10, the second rotational axis B2 is perpendicular to the paper surface.

Figure 15:
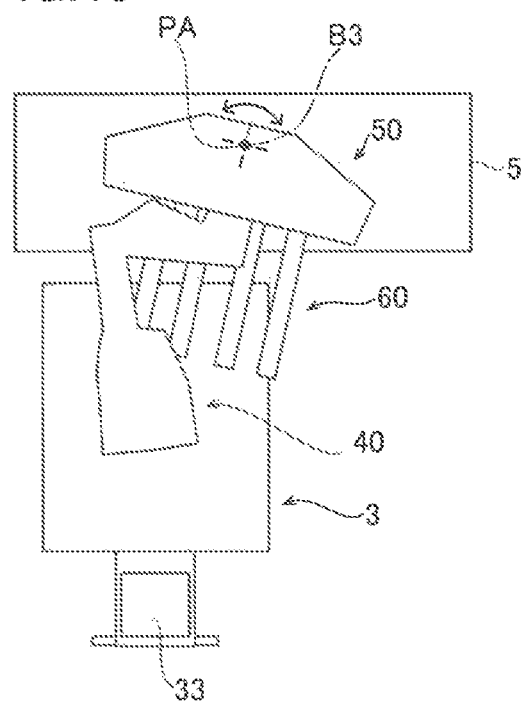
FIG. 15 is a view illustrating z-rotation of the arm base.

As illustrated in FIG. 15, the robot controller 31b can control the vertical articulated robot 40 so that the arm base 50 rotationally moves around an axis B3 extending in the vertical direction from the predetermined position PA. In addition, the robot controller 31b can control the vertical articulated robot 40 so that the arm base 50 is further moved along an axis extending in the vertical direction. In FIG. 15, the axis B3 is perpendicular to the paper surface.

The robot controller 31b causes the arm base 50 to rotationally move in the arc shape around the predetermined position PA only while the operation unit 33 that operates the vertical articulated robot 40 is operated. That is, when the arm base 50 moves while the direction is instructed by the operation unit 33, the arm base 50 moves in a direction in which the operation unit 33 is operated while the operation unit 33 is operated. In addition, when the movement direction is automatically or manually set, the arm base 50 moves in a set direction while the operation unit 33 is operated, and when the operation of the operation unit 33 is stopped, the movement of the arm base 50 is stopped. When different directions are instructed every moment by the operation unit 33, the robot controller 31b updates the rotation axis passing through the predetermined position PA every moment, based on the instruction of the operation unit 33, and causes the arm base 50 to rotationally move in the arc shape around the updated rotational axis.

As illustrated in FIGS. 10 and 11, the robot controller 31b can set the predetermined position PA on the axis extending in the vertical direction from the arm base 50.

The robot controller 31b can set the predetermined position PA on an optical axis of the imaging device 51 attached to the arm base 50. That is, the robot controller 31b sets the predetermined position PA, based on image capturing of the imaging device 51.

As illustrated in FIG. 10, the robot controller 31b can control the vertical articulated robot 40 so that the arm base 50 rotationally moves in the arc shape around a position based on the trocar T for inserting the endoscope 6 from the body surface of the patient P as the predetermined position PA. Specifically, the robot controller 31b sets the position based on the trocar T for inserting the endoscope 6 as the predetermined position PA, based on the image capturing of the imaging device 51 attached to the arm base 50. That is, the robot controller 31b acquires the position of the trocar T for inserting the endoscope 6, based on the image capturing of the imaging device 51. In this case, the robot controller 31b acquires a position in a plane of the trocar T, based on the image obtained by capturing the trocar T from above, and acquires a height position of the trocar T from information stored in advance. The robot controller 31b sets the predetermined position PA, based on the acquired position of the trocar T.

The robot controller 31b can set the predetermined position PA pointed by the pivot position teaching instrument 7 (refer to FIG. 7) to teach the pivot position PP (refer to FIG. 8) serving as the fulcrum for moving the surgical instrument 4, as the pivot position PP. The pivot position PP may be pointed by using the endoscope 6 without using the pivot position teaching instrument 7. In addition, the robot controller 31b can control the vertical articulated robot 40 so that the arm base 50 rotationally moves in the arc shape around the set pivot position PP.

The robot controller 31b can control the vertical articulated robot 40 so that the arm base 50 rotationally moves in the arc shape around the predetermined position PA, based on the optical axis direction of the endoscope 6. That is, the robot controller 31b causes the operation unit 80 to move the endoscope 6 attached to the arm 60, and puts a position to be set as the predetermined position PA into an angle of view of the endoscope 6. The robot controller 31b sets the center of the image of the endoscope 6 as the predetermined position PA.

The robot controller 31b can control the vertical articulated robot 40 so that the arm base 50 moves along the axis B3 passing through the predetermined position PA and extending in the vertical direction, and the first rotational axis B1 parallel to the direction in which the plurality of arms 60 are aligned on the arm base 50, based on the optical axis direction of the endoscope 6, and thereafter, can control the vertical articulated robot 40 so that the arm base 50 rotationally moves in the arc shape around the axis B3 passing through the predetermined position PA and extending in the vertical direction, and the second rotational axis B2 orthogonal to the first rotational axis B1.

Posture Adjustment Procedure in First Example

Next, a posture adjustment procedure in a first example will be described with reference to FIG. 17.

Figure 14:
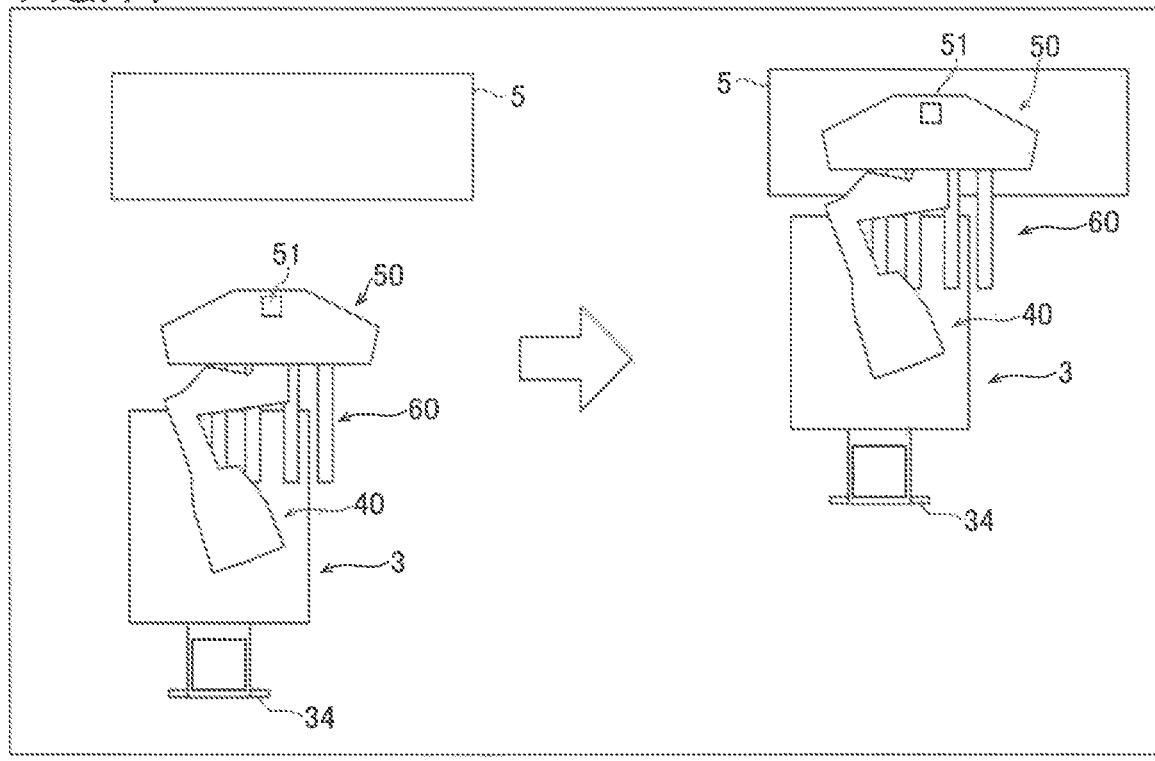
FIG. 14 is a view illustrating roll-in of the medical manipulator.

In Step S1 in FIG. 17, the medical manipulator 1 adopts a roll-in posture by an operator operating the joystick of the operation unit 33. In Step S2, as illustrated in FIG. 14, the medical manipulator 1 is rolled in by the operation of the operator. Specifically, the medical cart 3 is operated by the operator, and the arm base 50 is disposed above the surgery table 5. In this case, a lower portion is imaged by the imaging device 51 disposed in the arm base 50, and the medical cart 3 is moved so that a mark in the image of the imaging device 51 is aligned with a port of the endoscope 6.

In Step S3, as illustrated in FIG. 15, a rotation angle around a z-axis extending in the upward-downward direction is adjusted by the operator manually operating the joystick of the operation unit 33. That is, the vertical articulated robot 40 causes the arm base 50 to rotationally move around the axis B3 extending in the vertical direction. In addition, a posture of the arm base 50 around the axis B3 extending in the vertical direction is adjusted by the operator operating the joystick of the operation unit 33 while the operator views the image captured by the imaging device 51.

In Step S4, as illustrated in FIG. 11, the rotation angle around an x-axis extending in the horizontal direction and a longitudinal direction of the arm base is adjusted by the operator manually operating the joystick of the operation unit 33. That is, the vertical articulated robot 40 causes the arm base 50 to rotationally move around the first rotational axis B1. In addition, as illustrated in FIG. 10, the rotation angle around a y-axis extending in the horizontal direction and in a short direction of the arm base is adjusted by the operator manually operating the joystick of the operation unit 33. That is, the vertical articulated robot 40 causes the arm base 50 to rotationally move around the second rotational axis B2.

In Step S5, as illustrated in FIG. 16, the plurality of arms 60 adopt a setup posture. Specifically, the arm base 50 moves forward so that the plurality of arms 60 are disposed at positions suitable for the surgery, and the plurality of arms 60 are respectively deployed. In addition, a movement for adopting the setup posture is performed when the operator operates the operation unit 33.

In Step S6, the pivot position PP of the endoscope 6 is set. In Step S7, an adjustment behavior is performed by the operator operating the adjustment button 86 of the operation unit 80.

In Step S8, the endoscope 6 is attached by the operator. In Step S9, the pivot position PP of another surgical instrument 4 such as the forceps is set, and the surgical instrument 4 is attached.

Posture Adjustment Procedure in Second Example Next, a posture adjustment procedure in a second example will be described with reference to FIG. 18.

In Step S11 in FIG. 18, the medical manipulator 1 adopts the roll-in posture by the operator operating the joystick of the operation unit 33. In Step S12, as illustrated in FIG. 14, the medical manipulator 1 is rolled in by the operation of the operator. Specifically, the medical cart 3 is operated by the operator, and the arm base 50 is disposed above the surgery table 5. In this case, a lower portion is imaged by the imaging device 51 disposed in the arm base 50, and the medical cart 3 is moved so that a mark in the image of the imaging device 51 is aligned with a port of the endoscope 6.

In Step S13, as illustrated in FIG. 16, the plurality of arms 60 adopt the setup posture. Specifically, the arm base 50 moves forward so that the plurality of arms 60 are disposed at positions suitable for the surgery, and the plurality of arms 60 are respectively deployed. In addition, a movement for adopting the setup posture is performed when the operator operates the operation unit 33.

In Step S14, the pivot position PP of the endoscope 6 is set. In addition, the pivot position PP of the endoscope 6 is set as the predetermined position PA serving as a rotating center. In Step S15, the endoscope 6 is moved by the operator operating the operation unit 80 so that the endoscope 6 captures an image of the center of a target. Based on the optical axis direction of the moved endoscope 6, a rotationally moving posture around the first rotational axis B1 of the arm base 50 and a rotationally moving posture around the axis B3 extending in the vertical direction are set. In Step S16, the endoscope 6 is detached.

In Step S17, a targeting behavior is performed. Specifically, the angles of the arm base 50 around the x-axis and the z-axis are adjusted, based on the rotationally moving posture set based on the optical axis direction of the endoscope 6. As illustrated in FIG. 11, the vertical articulated robot 40 causes the arm base 50 to rotationally move around the first rotational axis B1 with the set rotationally moving posture. In addition, as illustrated in FIG. 15, the vertical articulated robot 40 causes the arm base 50 to rotationally move around the axis B3 extending in the vertical direction with the set rotationally moving posture. In addition, a movement for rotationally moving of the arm base 50 is performed when the operator operates the operation unit 33.

In Step S18, as illustrated in FIG. 10, the y-axis rotation angle is adjusted by the operator manually operating the joystick of the operation unit 33. That is, the vertical articulated robot 40 causes the arm base 50 to rotationally move around the second rotational axis B2.

In Step S19, the adjustment behavior is performed by the operator operating the adjustment button 86 of the operation unit 80.

In Step S20, the endoscope 6 is attached by the operator. In Step S21, the pivot position PP of another surgical instrument 4 such as the forceps is set, and the surgical instrument 4 is attached.

Posture Adjustment Procedure in Third Example Next, a posture adjustment procedure in a third example will be described with reference to FIG. 19.

In Step S31 in FIG. 19, the medical manipulator 1 adopts the roll-in posture by the operator operating the joystick of the operation unit 33. In Step S32, as illustrated in FIG. 14, the medical manipulator 1 is rolled in by the operation of the operator. Specifically, the medical cart 3 is operated by the operator, and the arm base 50 is disposed above the surgery table 5. In this case, a lower portion is imaged by the imaging device 51 disposed in the arm base 50, and the medical cart 3 is moved so that a mark in the image of the imaging device 51 is aligned with a port of the endoscope 6.

In Step S33, as illustrated in FIG. 16, the plurality of arms 60 adopt the setup posture. Specifically, the arm base 50 moves forward so that the plurality of arms 60 are disposed at positions suitable for the surgery, and the plurality of arms 60 are respectively deployed. In addition, a movement for adopting the setup posture is performed when the operator operates the operation unit 33.

In Step S34, the pivot position PP of the endoscope 6 is set. In addition, the pivot position PP of the endoscope 6 is set as the predetermined position PA serving as a rotating center. In Step S35, the endoscope 6 is moved by the operator operating the operation unit 80 so that the endoscope 6 captures an image of the center of the target. Based on the optical axis direction of the moved endoscope 6, a rotationally moving posture around the first rotational axis B1 of the arm base 50 and a rotationally moving posture around the axis B3 extending in the vertical direction are set. In Step S36, the endoscope 6 is detached.

In Step S37, the pivot position PP of another surgical instrument 4 such as the forceps is set. In this manner, the pivot positions PP of the plurality of surgical instruments 4 including the endoscope 6 are taught. The rotationally moving posture around the second rotational axis B2 of the arm base 50 is set, based on the arrangement of the set pivot positions PP of the plurality of surgical instruments 4. That is, the robot controller 31b causes the arm base 50 to rotationally move in the arc shape, based on the arrangement of the plurality of set pivot positions PP. Specifically, the robot controller 31b causes the arm base 50 to rotationally move around the second rotational axis B2 to be parallel to a direction connecting the pivot positions PP arranged in both ends of the plurality of pivot positions PP. In addition, when a rectangular region surrounding the respective pivot positions is taken in the image captured by the imaging device 51, the arm base 50 can rotationally move around the second rotational axis B2 to be parallel to the longitudinal direction in which a ratio of the length in the longitudinal direction to the length in the short direction is maximized.

In Step S38, the adjustment behavior is performed by the operator operating the operation unit 33. Specifically, the angles of the arm base 50 around the x-axis and the z-axis are adjusted, based on the rotationally moving posture set based on the optical axis direction of the endoscope 6. As illustrated in FIG. 11, the vertical articulated robot 40 causes the arm base 50 to rotationally move around the first rotational axis B1 with the set rotationally moving posture. In addition, as illustrated in FIG. 15, the vertical articulated robot 40 causes the arm base 50 to rotationally move around the axis B3 extending in the vertical direction with the set rotationally moving posture. In addition, the angle of the arm base 50 around the y-axis is adjusted, based on the rotationally moving posture set based on the arrangement of the pivot positions PP of the plurality of surgical instruments 4. As illustrated in FIG. 10, the vertical articulated robot 40 causes the arm base 50 to rotationally move around the second rotational axis B2 with the set rotational posture. In addition, a movement for rotationally moving of the arm base 50 is performed when the operator operates the operation unit 33.

In Step S39, the endoscope 6 is attached by the operator. In addition, another surgical instrument 4 such as the forceps is attached.

Advantageous Effect of Present Embodiment

In the present embodiment, the following effects can be achieved.

In the present embodiment, as described above, the robot controller 31b controls the vertical articulated robot 40 so that the arm base 50 rotationally moves in the arc shape around the predetermined position PA set at the position away from the arm base 50. In this manner, the angle and the position of the arm base 50 can be adjusted by the plurality of joints 43a to 43g of the vertical articulated robot 40. Therefore, a spatial range in which the tip of the surgical instrument can move can be adjusted by integrally moving the plurality of arms 60 to a desired angle and position. In addition, the arm base 50 is caused to rotationally move in the arc shape around the predetermined position PA set at the position away from the arm base 50. In this manner, a movement range of the plurality of surgical instruments 4 attached to the plurality of arms 60 can be moved around the predetermined position. In this manner, the movement range of the plurality of surgical instruments 4 can be adjusted to a suitable position corresponding to a surgical procedure or a body shape of the patient P.

In the present embodiment, as described above, the robot controller 31b controls the vertical articulated robot 40 so that the arm base 50 rotationally moves in the arc shape around the rotational axis passing through the predetermined position PA. In this manner, since the arm base 50 rotationally moves in the arc shape around the rotational axis, the arm base 50 can be easily adjusted to the desired angle and position.

In the present embodiment, as described above, the robot controller 31b controls the vertical articulated robot 40 so that the arm base 50 rotationally moves in the arc shape around the two rotational axes including the first rotational axis B1 passing through the predetermined position PA and parallel to the direction in which the plurality of arms 60 are aligned on the arm base 50, and the second rotational axis B2 passing through the predetermined position PA and existing in the vertical plane orthogonal to the first rotational axis B1. In this manner, the plurality of arms 60 can be integrally inclined in the forward-rearward direction by causing the arm base 50 to rotationally move in the arc shape around the first rotational axis B1. In addition, since the arm base 50 rotationally moves in the arc shape around the second rotational axis B2, the plurality of arms 60 can be integrally inclined in a lateral direction.

In the present embodiment, as described above, the robot controller 31b causes the arm base 50 to rotationally move in the arc shape around the predetermined position PA only while the operation unit 33 that operates the vertical articulated robot 40 is operated. In this manner, the arm base 50 rotationally moves, based on the operation of the operation unit 33 that operates the vertical articulated robot 40. Therefore, it is possible to prevent the arm base 50 from being unintentionally moved. In addition, the arm base 50 can be operated and moved at a desired timing before a surgery is carried out.

In the present embodiment, as described above, the predetermined position PA is set on the axis extending in the vertical direction from the arm base 50. In this manner, the center when the arm base 50 rotationally moves in the arc shape can be set directly below the arm base 50. Therefore, the arm base 50 can be inclined in a state where the arm base 50 is located directly above the predetermined position PA.

In the present embodiment, as described above, the predetermined position PA is set on the optical axis of the imaging device 51 attached to the arm base 50. In this manner, the center when the arm base 50 rotationally moves in the arc shape can be set, based on the image capturing of the imaging device 51. Therefore, the predetermined position PA serving as the rotating center of the arm base 50 can be accurately set to a desired position.

In the present embodiment, as described above, the robot controller 31b controls the vertical articulated robot 40 so that the arm base 50 rotationally moves in the arc shape around the position based on the trocar T for inserting the endoscope 6 from the body surface of the patient P serving as the predetermined position PA. In this manner, the arm base 50 rotationally moves in the arc shape around the trocar T for inserting the endoscope 6 into the patient P. Therefore, the movement range of the surgical instrument 4 including the endoscope 6 can be moved around the trocar T.

In the present embodiment, as described above, the robot controller 31b sets the position based on the trocar T for inserting the endoscope 6, as the predetermined position PA, based on the image capturing of the imaging device 51 attached to the arm base 50. In this manner, the position of the trocar T can be acquired by the image capturing of the imaging device 51. Therefore, the predetermined position PA serving as the rotating center of the arm base 50 can be accurately set to a desired position.

In the present embodiment, as described above, the robot controller 31b sets the predetermined position PA pointed by the pivot position teaching instrument 7 to the pivot position PP serving as the fulcrum for moving the surgical instrument 4, and controls the vertical articulated robot 40 so that the arm base 50 rotationally moves in the arc shape around the pivot position PP. In this manner, the center when the arm base 50 rotationally moves in the arc shape can be set, based on the teaching of the pivot position teaching instrument 7. Therefore, the predetermined position PA serving as the rotating center of the arm base 50 can be accurately set to the desired position.

In the present embodiment, as described above, the robot controller 31b controls the vertical articulated robot 40 so that the arm base 50 rotationally moves in the arc shape around the predetermined position PA, based on the optical axis direction of the endoscope 6. In this manner, the center when the arm base 50 rotationally moves in the arc shape can be set, based on the optical axis direction of the endoscope 6. Therefore, the predetermined position PA serving as the rotating center of the arm base 50 can be easily set.

In the present embodiment, as described above, the robot controller 31b controls the vertical articulated robot 40 so that the arm base 50 moves around the predetermined position PA along the axis B3 extending in the vertical direction and the first rotational axis B1 parallel to the direction in which the plurality of arms 60 are aligned on the arm base 50, based on the optical axis direction of the endoscope 6, and thereafter, controls the vertical articulated robot 40 so that the arm base 50 rotationally moves in the arc shape around the predetermined position PA around the axis B3 extending in the vertical direction and the second rotational axis B2 orthogonal to the first rotational axis B1. In this manner, the arm base 50 rotationally moves around the axis B3 extending in the vertical direction, the first rotational axis B1, and the second rotational axis B2. Therefore, a degree of freedom in adjusting the angle and the position of the arm base 50 can be further improved.

In the present embodiment, as described above, the arm 60 does not include a mechanism for holding the trocar T. In this manner, it is not necessary to provide the mechanism for holding the trocar T. Therefore, an apparatus configuration can be simplified.

Modification Example

It needs to consider that the embodiments disclosed herein are examples in all respects and are not considered to be restrictive. The scope of the present disclosure is disclosed by the appended claims rather than the above-described embodiments, and further includes all changes (modification examples) within the meaning and the scope which are equivalent to the appended claims.

For example, in the above-described embodiment, an example has been described in which four arms are provided, but the present disclosure is not limited thereto. In the present disclosure, the number of arms may be any desired number as long as at least one or more arms are provided.

In the above-described embodiment, a configuration example has been described in which the predetermined position serving as the rotating center is pointed by using the pivot position teaching instrument or the endoscope, but the present disclosure is not limited thereto. In the present disclosure, the surgical instrument such as the forceps for carrying out the surgery, which is attached to the tip of the arm, may be used to point to the predetermined position serving as the rotating center.

In the above-described embodiment, an example has been described in which the arm base is moved by operating the operation unit provided in the medical cart, but the present disclosure is not limited thereto. In the present disclosure, the arm base may be moved by operating the operation unit provided in the arm.

In the above-described embodiment, an example has been described in which the arm base is moved in a state where the surgical instrument including an endoscope is attached, but the present disclosure is not limited thereto. In the present disclosure, the arm base may be movable when all of the surgical instruments including the endoscope are detached.

In the above-described embodiment, an example has been described in which the rotationally moving posture of the arm base is set based on the optical axis direction of the endoscope, but the present disclosure is not limited thereto. In the present disclosure, a movable posture of the arm base may be automatically set based on the surgical procedure or a roll-in direction.

In the above-described embodiment, an example has been described in which the target direction is acquired based on the optical axis direction of the endoscope, but the present disclosure is not limited thereto. In the present disclosure, a sensor that senses the target direction may be provided to acquire the target direction. In addition, the target direction may be limited and set. In addition, the target direction may be set step by step for each direction. When the endoscope has a squint-viewing direction, the target direction may be set in view of the squint-viewing direction.

In the above-described embodiment, an example has been described in which the arm unit and the vertical articulated robot are the seven-axis articulated robots, but the present disclosure is not limited thereto. For example, the arm unit and the vertical articulated robot may be the articulated robots having an axis configuration of six or more axes other than the seven-axis articulated robot.

In the above-described embodiment, an example has been described in which the plurality of arms 60 have the configurations the same as each other, but the present disclosure is not limited thereto. In the present disclosure, the plurality of arms 60 may have different configurations.

In the above-described embodiment, an example has been described in which all of the arms are the seven-axis articulated robots, but the present disclosure is not limited thereto. For example, some of the four arms may be the seven-axis articulated robots.

In the above-described embodiment, an example has been described in which the medical manipulator can be moved by the medical cart, but the present disclosure is not limited thereto. For example, the medical manipulator may be fixedly provided, or may be moved along a rail.

In the above-described embodiment, an example has been described in which the articulated robot causes the arm base to rotationally move around the first rotational axis extending in the horizontal direction, the second rotational axis extending in the horizontal direction orthogonal to the first rotational axis, and the axis extending in the vertical direction, but the present disclosure is not limited thereto. In the present disclosure, the articulated robot arm may cause the arm base to rotationally move around the first rotational axis which is inclined with respect to the horizontal direction. In addition, the articulated robot arm may cause the arm base to rotationally move around the second rotational axis which is inclined with respect to the horizontal direction. In addition, the articulated robot arm may cause the arm base to rotationally move round an axis which is inclined with respect to the vertical direction.

In the above-described embodiment, a configuration example has been described in which the articulated robot causes the arm base to rotationally move in the arc shape before the surgery, but the present disclosure is not limited thereto. In the present disclosure, the articulated robot may cause the arm base to rotationally move in the arc shape during the surgery. In this case, the robot controller may cause the arm base to rotationally move in the arc shape in a state where the surgical instrument is restrained at the pivot position while the tip position of the surgical instrument is maintained during the surgery.

What is claimed is:

1. A surgical robot comprising:
   a plurality of arms to each of which a surgical instrument is attached;
   an elongate arm base extending on a longitudinal axis, to which the plurality of arms attached to the arm base spaced apart at positions along the longitudinal axis;
   an articulated robot having six or more axes and configured to move the arm base; and
   a medical cart comprising a robot controller that controls a movement of the articulated robot,
   wherein
   each of the plurality of arms is independently moveable from a respective attachment point at which the respective arm is attached to the arm base,
   the robot controller controls the articulated robot so that the arm base rotationally moves in an arc shape around a predetermined position set at a position away from the arm base,
   the robot controller controls the articulated robot so that the arm base rotationally moves in the arc shape around a rotational axis passing through the predetermined position, and
   the robot controller controls the articulated robot so that the arm base rotationally moves in the arc shape around two rotational axes including a first rotational axis passing through the predetermined position and parallel to a direction in which the plurality of arms are aligned on the arm base, and a second rotational axis passing through the predetermined position and existing in a vertical plane orthogonal to the first rotational axis.

2. The surgical robot according to claim 1, wherein
   the medical cart further comprises:
   an operation unit comprising a joystick that operates the articulated robot, and the robot controller causes the arm base to rotationally move in the arc shape around the predetermined position only while the operation unit is operated.

3. The surgical robot according to claim 1, wherein the predetermined position is set on an axis extending from the arm base in a vertical direction.

4. The surgical robot according to claim 1, further comprising:
an imaging device attached to the arm base,
wherein the predetermined position is set on an optical axis of the imaging device.

5. A surgical robot comprising:
a plurality of arms to each of which a surgical instrument is attached;
an elongate arm base extending on a longitudinal axis, the plurality of arms attached to the arm base spaced apart at positions along the longitudinal axis;
an articulated robot having six or more axes and configured to move the arm base; and
a robot controller that controls a movement of the articulated robot, wherein
each of the plurality of arms is independently moveable from a respective attachment point at which the respective arm is attached to the arm base,
the robot controller controls the articulated robot so that the arm base rotationally moves in an arc shape around a predetermined position set at a position away from the arm base,
the surgical instrument includes an endoscope, and
the robot controller controls the articulated robot so that the arm base rotationally moves in the arc shape around a rotational axis passing through a position based on a trocar for inserting the endoscope from a body surface of a patient, as the predetermined position, wherein
the robot controller controls the articulated robot so that the arm base rotationally moves in the arc shape around two rotational axes including a first rotational axis passing through the predetermined position and parallel to a direction in which the plurality of arms are aligned on the arm base, and a second rotational axis passing through the predetermined position and existing in a vertical plane orthogonal to the first rotational axis.

6. The surgical robot according to claim 5, further comprising:
an imaging device provided on the arm base,
wherein the robot controller sets the position based on the trocar for inserting the endoscope, as the predetermined position, based on image capturing of the imaging device.

7. The surgical robot according to claim 1, further comprising:
a pivot position setting switch to set a pivot position serving as a fulcrum of a movement of the surgical instrument,
wherein the robot controller sets the pivot position set by an operation of the pivot position setting switch as the predetermined position, and controls the articulated robot so that the arm base rotationally moves in the arc shape around the pivot position.

8. The surgical robot according to claim 7, wherein the robot controller causes the arm base to rotationally move in the arc shape, based on an arrangement of a plurality of the set pivot positions.

9. The surgical robot according to claim 7, wherein during a surgery, the robot controller causes the arm base to rotationally move in the arc shape while a tip position of the surgical instrument is maintained and the surgical instrument is restrained at the pivot position.

10. The surgical robot according to claim 7, wherein the surgical instrument includes an endoscope, and
the robot controller controls the articulated robot so that the arm base rotationally moves in the arc shape around the predetermined position, based on an optical axis direction of the endoscope.

11. The surgical robot according to claim 10, wherein the robot controller controls the articulated robot so that the arm base moves along an axis passing through the predetermined position and extending in a vertical direction, and a first rotational axis passing through the predetermined position and parallel to a direction in which the plurality of arms are aligned on the arm base, based on the optical axis direction of the endoscope, and thereafter, controls the articulated robot so that the arm base rotationally moves in the arc shape around the axis passing through the predetermined position and extending in the vertical direction and a second rotational axis passing through the predetermined position and orthogona to the first rotational axis.

12. The surgical robot according to claim 1, wherein the robot controller controls the articulated robot so that the arm base is further translated after the arm base rotationally moves in the arc shape.

13. The surgical robot according to claim 1, wherein the arm does not include a mechanism for holding a trocar.

* * * * *